US011747634B1

(12) United States Patent
Mullins et al.

(10) Patent No.: US 11,747,634 B1
(45) Date of Patent: Sep. 5, 2023

(54) AUGMENTED REALITY CONTENT CREATION

(71) Applicant: META PLATFORMS TECHNOLOGIES, LLC, Menlo Park, CA (US)

(72) Inventors: Brian Mullins, Sierra Madre, CA (US); Matthew Kammerait, West Hollywood, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/483,448

(22) Filed: Sep. 23, 2021

Related U.S. Application Data

(63) Continuation of application No. 15/043,959, filed on Feb. 15, 2016, now Pat. No. 11,150,482.

(60) Provisional application No. 62/120,808, filed on Feb. 25, 2015.

(51) Int. Cl.
*G02B 27/01* (2006.01)
*G06F 3/01* (2006.01)

(52) U.S. Cl.
CPC ....... *G02B 27/0179* (2013.01); *G02B 27/017* (2013.01); *G06F 3/011* (2013.01); *G06F 3/012* (2013.01); *G02B 2027/014* (2013.01); *G02B 2027/0138* (2013.01); *G02B 2027/0187* (2013.01)

(58) Field of Classification Search
CPC .............. G02B 27/0179; G02B 27/017; G02B 2027/0138; G02B 2027/014; G02B 2027/0187; G06F 3/011; G06F 3/012
See application file for complete search history.

(56) References Cited

U.S. PATENT DOCUMENTS

| 2008/0005702 | A1 | 1/2008 | Skourup et al. |
| 2008/0100570 | A1 | 5/2008 | Friedrich et al. |
| 2013/0044129 | A1 | 2/2013 | Latta et al. |
| 2014/0310595 | A1 | 10/2014 | Acharya et al. |
| 2014/0362110 | A1* | 12/2014 | Stafford ............... G06T 19/006 345/633 |
| 2014/0375691 | A1 | 12/2014 | Kasahara |

(Continued)

FOREIGN PATENT DOCUMENTS

| WO | 2016153628 A2 | 9/2016 |
| WO | 2016153628 A3 | 12/2016 |

OTHER PUBLICATIONS

International Preliminary Report on Patentability for International Application No. PCT/US2016/017974, dated Sep. 8, 2017, 8 Pages.

(Continued)

*Primary Examiner* — Said Broome
*Assistant Examiner* — Andrew Shin
(74) *Attorney, Agent, or Firm* — Fenwick & West LLP

(57) ABSTRACT

A system and method for generating a virtual content to a physical object is described. A processor includes an augmented reality application. The augmented reality application creates virtual content at the head mounted device, and associates the virtual content with predefined conditions based on data from sensors embedded in the head mounted device at a time of creation of the virtual content. The virtual content is displayed in a display of the head mounted device in response to sensor data satisfying the predefined conditions.

20 Claims, 12 Drawing Sheets

(56) References Cited

U.S. PATENT DOCUMENTS

2015/0097862 A1    4/2015   Reisner-Kollmann et al.
2015/0379770 A1   12/2015   Haley, Jr. et al.

OTHER PUBLICATIONS

International Search Report and Written Opinion for International Application No. PCT/US2016/017974, dated Nov. 16, 2016, 9 Pages.

* cited by examiner

AUGMENTED REALITY CONTENT CREATION

PRIORITY APPLICATION

This application claims priority to U.S. Non-Provisional application Ser. No. 15/043,959, filed Feb. 15, 2016, which claims priority to U.S. Provisional Application Ser. No. 62/120,808, filed Feb. 25, 2015, the disclosure of each of which is incorporated herein in its entirety by reference.

TECHNICAL FIELD

The subject matter disclosed herein generally relates to the processing of data. Specifically, the present disclosure addresses systems and methods for generating augmented reality content using a head mounted device.

BACKGROUND

Augmented reality (AR) is a live, direct or indirect view of a physical, real-world environment whose elements are augmented by computer-generated sensory input such as sound, video, graphics, or global positioning system (GPS) data. With the help of advanced AR technology (e.g., adding computer vision and object recognition) the information about the surrounding real world of the user becomes interactive. Device-generated (e.g., artificial) information about the environment and its objects can be overlaid on a display through which a user views objects in the real world.

The user can create AR content associated with physical objects using an AR content software tool and the AR content may then be stored on a server. In certain circumstances, the AR content may be provided to an AR device (or devices) when the AR device recognizes a corresponding physical object.

BRIEF DESCRIPTION OF THE DRAWINGS

Some embodiments are illustrated by way of example and not limitation in the figures of the accompanying drawings.

DETAILED DESCRIPTION

Figure 1:
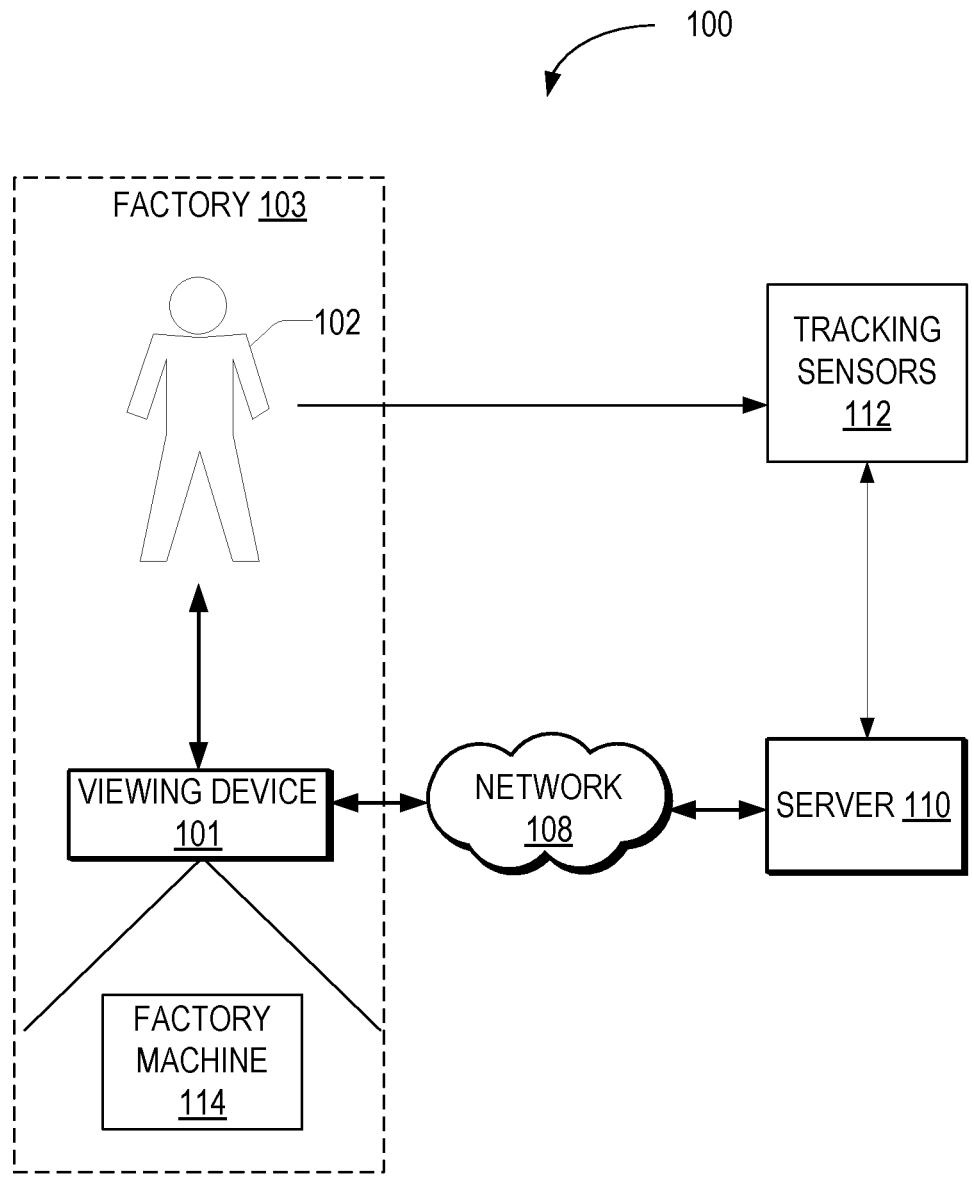
FIG. 1 is a block diagram illustrating an example of a network environment suitable for creating virtual content for a physical object, according to some example embodiments.

Example methods and systems are directed to creation of virtual content from a head mounted device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality (AR) applications allow a user to experience AR content, such as in the form of a virtual object displayed in a viewing device. The viewing device may include a display, a camera, and an AR application implemented by a hardware processor. The virtual object may be associated with a physical object perceived with the camera of the viewing device. The physical object may include a visual reference (e.g., QR code on a surface of the physical object or feature points of the physical object) that the AR application can identify. The AR application identifies the visual reference from an image or video frame of the physical object and retrieves the virtual object associated with the visual reference or captured image of the physical object. The viewing device may locally render the virtual object based on a position of the viewing device relative to the physical object. The virtual object may include a three-dimensional virtual object or a two-dimensional virtual object. For example, the three-dimensional virtual object may include a three-dimensional model of a circuit switch. The two-dimensional virtual object may include a two-dimensional view of a dialog box, menu, or statistics information related to the physical object. AR content may be alternatively referred to as virtual content.

In an example embodiment, the viewing device includes a head mounted device (HMD), such as a helmet or eyewear, that can be worn by a user. The HMD may also include transparent lenses through which the user can view AR content. The transparent lenses may include a transparent display to generate a visualization of the AR content in a light of sight between the eyes of the user and the physical object being watched by the user. The HMD can be a standalone device that can be used to create virtual content without using a client device (e.g., laptop or desktop). Accordingly, in an example embodiment, the actual HMD that can be used for presenting AR content to a user, at least partially, creates the virtual content (which may, optionally, be displayed by other HMDs). Thus, the wearer of the HMD may determine (other than another third party) virtual content to be associated with a physical object. The wearer of the HMD may also be referred to as the user of the HMD.

Virtual content includes multimedia content that can be played in the HMD. For example, multimedia content includes video, audio, and graphical animation content. Visual content can be displayed in the display of the HMD. Audio content can be played through built-in speakers in the HMD.

In an example embodiment, the HMD associates the virtual content with identifiers of the physical object and tracking data related to the physical object. Example identifiers include a QR code or other visual identifying reference, such as feature points, that can be visually scanned using the camera of the HMD. Examples of tracking data include wireless identification signals broadcasted from the physical object (e.g., Bluetooth, beacon signals). Other tracking data include location data of the physical object as determined by a GPS location of the HMD in proximity to the physical object, an orientation of the HMD, and a distance between the location of the HMD and the location of the physical object. Sensors included in the physical object may also generate tracking data (e.g., GPS data, status data). For example, the physical object may include a switch with a sensor that broadcasts a wireless switch status signal indicating the position of the switch (e.g., toggled position). Therefore, the HMD may use the identifiers of the physical object to identify the physical object and retrieve the corresponding virtual content associated with the physical object. The HMD may further use the tracking data of the physical object to track a status of the physical object and to track operations performed on the physical object by the user of the HMD by use of sensors in the HMD and in the physical object. The operations may include, for example, turning on a switch, physically moving a component of the physical object, such as opening a circuit panel.

An example way to capture the operations performed on the physical object is by recording a video of the wearer of the HMD interacting with the physical object from the point of view of the user wearing the HMD. For example, a camera in the HMD records the wearer of the HMD repairing the physical object. The video may be divided into different video clips that are associated with specific positions or orientations of the HMD relative to the physical object. Video or parts thereof may then be stored at a server that can provide (e.g., via a wireless network) the video or part thereof to another HMD. Each video may be associated with metadata that include information related to positions (e.g., 2 feet away from a machine) and orientations (e.g., HMD looking at the front of a machine) of the HMD relative to the physical object. For example, a video clip showing an authoring user operating components on a machine (e.g., turning dials, flipping switches, attaching or detaching circuit components) may be displayed in the HMD of another user or subsequent user when the HMD of that other user is at a location of the machine and within a position and orientation associated with the video clip. One video clip may be associated with a specific orientation and position of the HMD relative to the machine. In other embodiments, several video clips may be associated with a specific orientation and position of the HMD relative to the machine. In that situation, the HMD identifies and plays the relevant video clip based on a condition of the machine (e.g., overheated, normal operation, specific error code) as determined by sensors in the HMD or in the machine. Therefore, a video clip related to how to fix an overheated machine may be displayed in the HMD when the wearer of the HMD is oriented towards the front of a machine, and the condition of the machine shows that it is overheated. Similarly, a different video clip related to how to address a specific error code may be displayed in the HMD when the HMD is in the same previous location and orientation, and the condition of the machine is associated with the specific error code. Accordingly, AR content authored by one user of an HMD may then be provided to and displayed in other HMDs. The wearer of the HMD authoring the content is also referred to as an authoring user.

Another example of a way to capture the operations performed on the physical object is by tracking relative locations of identifying feature points in an image or a video frame of the physical object and recording in the changes in location of the identifying feature points. The identifying feature points may be corner points of a printed square, corner points of physical objects, or points of high contrast ratio. The feature points, themselves, do not change when viewed from any observation angle. The HMD tracks relative movement of the feature points to map movement of the physical object.

For example, a user wearing an HMD opens a panel or enclosure and views a circuit board through the lenses of the HMD. The HMD may first identify the panel based on predefined identifying feature points and sensor data from the HMD and the circuit board (e.g., corner points of the panel, GPS location of the HMD, wireless signal broadcasting an ID from the circuit board and the panel). The HMD may then track how the panel or a door of an enclosure has moved based on changes of the corner points of the panel. For example, the HMD may track and record spatial geometric points (e.g., corner points) on the panel. The opening of the panel is tracked and recorded in the form of changes to the spatial geometric points. The HMD can use the changes to the spatial geometric points to generate virtual content. For example, the HMD generates a virtual arrow to indicate a direction in which to open the panel based on the changes to the location of the corner points of the panel perceived by the HMD and sensor data from sensors on the panel.

The AR content may be displayed in a HMD when the HMD is positioned in a line of sight of the wearer of the HMD and the HMD is directed to the physical object at the same (or similar point) in a three dimensional space as the HMD that originated or initially generated the AR content. For example, when another or second HMD views the same physical object, the second HMD retrieves the originally authored virtual content. The original authored virtual content may then be communicated to the second HMD which may then show a video clip or an animation of a virtual panel being opened just like when the authoring user opened the panel. The second HMD may trigger a display of the animation or video clip based on preset conditions such as when the user approaches and views the panel from a specific orientation and position at a particular time or based on specific conditions. An example of a specific condition may be when the user is authorized to open the panel based on credentials of the user of the HMD. Another example of a specific condition may be when a malfunction of equipment has occurred and the panel provides access to reboot, restart, or otherwise provide corrective maintenance.

It will be noted that the virtual content that is, directly or indirectly (e.g., by producing an animation), authored using a first HMD and subsequently communicated to one or more other HMDs, may include recorded media, a two-dimensional or three-dimensional model animation, and text. A library of virtual content may be created wherein each content item may be associated with a different physical object (e.g., a particular machine in a power plant, manufacturing facility, etc.). For example, the HMD may record the user performing steps to repair a machine. The recorded steps may be in the form of a media (e.g., video clip) or tracking data (e.g., tracking the changes in the relative location of the identifying feature points). A graphics animation (e.g., virtual arrow showing a direction in which to flip a switch) may be generated based on the tracking data. The virtual content may include the media or the graphics animation. The virtual content is uploaded to a server and stored and tagged or associated with repairing the particular machine. Accordingly, another user of an HMD encountering the same or similar machine can retrieve and visualize the repair steps from the virtual content using his or her HMD that is communicatively coupled (e.g., via one or more networks) to a server or an AR content repository. The user or any other subsequent user may, using his or her HMD, see video clips associated with each repair step or can see animation of virtual objects (e.g., virtual pieces or arrows, audio instructions, wiring diagrams, etc.) associated with each repair step.

In an example embodiment, one or more servers receive the virtual content (e.g., captured video footage, graphics animation, tracking data based on location changes to the identifying feature points of a particular machine) generated by the authoring user of the authoring HMD, and associate or tag the virtual content to an identifier of a machine. The identifier uniquely identifies the machine using, for example, a location of the machine or a serial number of the machine. One or more servers store the virtual content, the corresponding identifier of the machine, and corresponding parameters or conditions associated with the virtual content. Examples of parameters or conditions may include a temperature range of a machine located at a specific location, an operating status of the machine, and credentials of the wearer of the HMD. When a location, status, orientation, or position of another HMD meets the parameters or conditions associated with the virtual content, the servers provide the corresponding virtual content to the HMD. Thus, when or where the virtual content (e.g., video or animations) is communicated to the HMD may be dependent on the wearer of the HMD being in proximity to a physical object (e.g., an industrial machine, a machine, an apparatus) associated with the virtual content, the nature of the problem or malfunction of the physical object or apparatus associated with the virtual content, the operational state of the physical object or apparatus associated with the virtual content. For example, the server provides virtual content (e.g., video footage) demonstrating how to operate an industrial machine to the HMD when the HMD is located in proximity to the industrial machine. In another example, the server detects the nature of the malfunction of the industrial machine based an error code output from the industrial machine. The server retrieves the relevant video footage associated with the error code and provides the relevant video footage to the HMD located in proximity to the industrial machine. In yet another example, the server determines the technical level (e.g., apprentice or advanced) of the wearer of the HMD based on an identification or authentication credentials of the wearer of the HMD. The wearer of the HMD may be authenticated, for example, using biometrics authentication methods (e.g., iris scan of the eyes of the wearer of the HMD). The server retrieves the relevant video footage associated with the corresponding technical level of the wearer of the HMD. Therefore, a video footage including advanced technical descriptions may be provided to a wearer of the HMD with an advanced technical expertise as determined by the authentication credentials of the wearer of the HMD.

In one example embodiment, the AR content may be associated to a corresponding geographical location, a process a user is performing (e.g., fixing an engine), ambient information (e.g., humidity and temperature), a tagged location or actions by other users, and specific type/brand/model of machines. The AR content may be accessed from another HMD device or a client device that can further edit the AR content by modifying, supplementing, deleting, changing portions of the AR content. For example, the client device can modify a color or shape of a three-dimensional model of a physical object in the AR content. The client device can access the AR content from the server using a web-based application to edit and adjust the size, color, or shape of a virtual arrow in the AR content. The client device can also use the web-based application to trim a duration of a video footage in the AR content, combine different video footages into one video footage in the AR content, and associate the video footage with another physical object. The client device can change parameters associated with the AR content and the physical object. For example, the client device can change the temperature threshold to trigger the AR content for a particular industrial machine.

An authoring user of a HMD may generate custom content or may select from a library or repository of AR content stored on the HMD or retrievable from a remote server via a network. The library may include three-dimensional models of virtual content of similar physical objects (e.g., machines having similar shape, machines located on the second floor of a factory, or machines located within a user defined area). Accordingly, the authoring user of the HMD selects a three-dimensional model of virtual content of a physical object similar to the physical object in proximity to the HMD. The authoring user of the HMD may select the model using voice command or other user interface means while navigating a menu displayed in the display of the HMD. Furthermore, the authorizing user of the HMD may create interactive content or a static menu of information identifying the physical object (e.g., apparatus) being viewed or pointed to by the HMD. In another example embodiment, the virtual content may include interactive virtual functions associated with functions of the physical object (e.g., a virtual red button when activated stops the particular machine). The virtual content may also display dynamic information, such as status update (e.g., virtual green light to indicate that the machine is operating as expected).

In an example embodiment, the HMD can detect, generate, and identify identifiers such as feature points (e.g., unique spatial geometric attributes) of a physical object being viewed or pointed to by the HMD. The HMD captures an image or a video frame of the physical object. The HMD determines identifiers in the image or video frame of the physical object and identifies the physical object based on the identifiers and tracking data (e.g., GPS location of the physical object) related to the physical object. The HMD may then retrieve the virtual content associated with the physical object. The HMD may include a screen to display the retrieved virtual content in relation to an image of the physical object captured by a camera and displayed on a display screen of the HMD. In another example embodiment, the HMD includes a transparent display that can display the retrieved virtual content in relation to a position and an orientation of the HMD relative to the physical object, as viewed by a user through the transparent display. Sensors in the HMD may be used to determine the location and the orientation of the HMD relative to the physical object in the physical environment of the HMD. The transparent display may be positioned in the HMD such that the user can view the physical object through the transparent display. The location may include a geographic location determined based on wireless data generated by the HMD or triangulated from the predefined references of the physical environment, a GPS device or any other location identifier. The orientation may be determined based on gyroscope data from an inertial measurement unit (IMU) sensors provided in the HMD or externally determined using a three-dimensional camera sensor.

In one example embodiment, the HMD communicates with a server that has a storage device for storing a database or library of virtual content generated at the HMD or from other HMDs, corresponding identifiers of the physical objects, and parameters or tracking data related to the physical objects. Another HMD may send to the server identifiers captured from the physical object, tracking data, and other sensor data (e.g., location, ambient information). The server may then identify the physical object based on the identifiers of the physical object (and, optionally, the tracking data) and query the database. The database may include a plurality of reference identifiers each corresponding to a physical object, or features thereof, that identify virtual content. In this manner, virtual content corresponding to the identifier received from the HMD may be identified. The server may then retrieve the virtual content (e.g., a video footage or a three-dimensional virtual object animation) associated with the identified physical object and the other sensor data and communicate the virtual content to the HMD. It will be appreciated that at least part of the database may reside locally on the HMD, may be remotely provided, or any combination thereof. Furthermore, each HMD can store a database that is customized for a particular user so that most of the information relevant to the particular user is already available locally. For example, virtual content related to manufacturing equipment commonly operated by a worker may be locally stored in the HMD of the worker. Virtual content related to special manufacturing equipment which the worker has privilege access may be locally stored in the HMD of that worker.

In another example embodiment, the server receives an image of the physical object and tracking data from a HMD. The server may analyze the image, for example, to generate feature points from the image of the physical object. The server may then identify a physical object based on the generated feature points of the physical object and tracking data after querying the database of reference identifiers of physical objects and tracking data related to physical objects. Finally, the server may retrieve the virtual content associated with the identified physical object and communicate it to the HMD for presentation to the user.

A non-transitory machine-readable storage device may store a set of instructions that, when executed by at least one processor, causes the at least one processor to perform any one or more of the methodologies described within the present disclosure.

FIG. 1 is a network diagram illustrating a network environment 100 suitable for creating virtual content for a physical object, according to some example embodiments. The network environment 100 includes a viewing device 101 and a server 110, communicatively coupled to each other via a network 108. The viewing device 101 and the server 110 may each be implemented in a computer system, in whole or in part, as described below with respect to FIGS. 2 and 6.

The server 110 may be part of a network-based system. For example, the network-based system may be or include a cloud-based server system that provides virtual content such, as three-dimensional models or video footage, to the viewing device 101.

A user 102 may utilize the viewing device 101 to view a physical object (e.g., factory machine) in a local real world environment such as at a factory 103. The user 102 may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the viewing device 101 and may be a user 102 of the viewing device 101. For example, the viewing device 101 may be a HMD (e.g., wearable computing device with a display that is worn on a head of the user 102). The computing device may also be worn on other parts of the body (e.g., arms or hip) of the user 102. In one example embodiment, the display may be transparent or semi-transparent such as in lenses of wearable computing glasses.

The user 102 may use the viewing device 101 to author virtual content using an AR application in the viewing device 101. The AR application may also provide the user 102 with AR content triggered by a view of the physical object and other data points related to the physical object or to the viewing device 101. The physical object may include a two-dimensional physical object (e.g., a picture) or three-dimensional physical object (e.g., a factory machine 114). Examples of data points related to the physical object may include location information (e.g., first floor of a factory facility, GPS coordinates) or spatial geometric references (e.g., perceived corners of walls or furniture, unique identifiers or markers) in the real world physical environment. For example, the user 102 may direct a camera of the viewing device 101 to capture an image of the factory machine 114. The viewing device 101 identifies feature points (e.g., edges, corners, surface of the machine, unique spatial geometric patterns) in the picture or video frame of the factory machine 114 to identify the factory machine. The viewing device 101 accesses a local library (e.g., local context recognition dataset or any other previously stored dataset of the AR application) of the viewing device 101 to retrieve a virtual object corresponding to the feature points. The local library may also include models of virtual objects associated with feature points of real-world physical objects or references. In another example embodiment, the viewing device 101 identifies tracking data related to the factory machine 114. Examples of tracking data include GPS location of the factory machine 114, unique wireless identifier, operating status, and distance from the user viewing device 101 to the factory machine 114.

In an example embodiment, the viewing device 101 enables the user 102 to create virtual content for the factory machine 114 from the viewing device 101 by recording a video the user 102 operating on the factory machine 114. For example, the viewing device 101 may record a video footage of the user 102 fixing the factory machine 114. The user 102 may use different types of user interfaces to start and stop the video recording. Examples of user interfaces include a voice command, a gesture command by waving the user's hand in a predefined pattern, and a touch sensitive area in the viewing device. The video footage may be tagged with metadata identifying a position of the viewing device 101 relative to the factory machine 114. For example, the metadata may include information identifying the distance between the viewing device 101 and orientation of the viewing device 101 relative to the factory machine 114. The relative distance and orientation of the viewing device 101 may be measured with internal sensors (e.g., Inertial Measurement Unit sensors, depth sensors) in the viewing device 101, external sensors (e.g., depth sensor cameras in the factory 103 or on the factory machine 114), or a combination thereof. The video footage and corresponding metadata is stored in the viewing device 101 and later can be offloaded to the server 110.

The viewing device 101 may also monitor and track changes in the location of feature points of a component of the factory machine 114 relative to feature points of other components of the factory machine 114 in the video footage. For example, feature points on a circuit panel may move relative to other feature points of the factory machine 114. Consequently, the viewing device 101 can determine and identify that a component has moved in a particular direction (e.g., a switch has been flipped in a direction) based on the relative motion of the feature points. The viewing device 101 generates a virtual object based on the relative changes of the feature points in the factory machine 114. For example, the virtual object may include an animation of a virtual three-dimensional arrow indicating a direction in which the flip is toggled. The virtual object is stored in the viewing device 101 and later can be offloaded to the server 110. Therefore, the viewing device 101 generates a video footage, a virtual object, or a combination thereof. The video footage and virtual object may be referred to as virtual content.

In another example embodiment, the server 110 receives the virtual content authored and created at the viewing device 101. The virtual content may also be available to other users of other viewing devices. Consequently, a second user of a second viewing device can access and retrieve the virtual content authored by a first user when the location of the second viewing device worn by the second user is in proximity to the factory machine 114. The location and orientation of the second viewing device may be detected with internal sensors in the second viewing device, or with external tracking sensors 112. In another example embodiment, the server 110 provides the virtual content about the factory machine 114 to other viewing devices when the other viewing devices are within a predefined distance range of the factory machine 114 (e.g., 2 to 5 feet distance between a viewing device and the factory machine 114) and within a predefined position and orientation range related to the factory machine 114 (e.g., a viewing device is in front of the factory machine 114 and is level—not looking up or down). The viewing device 101 may define the distance range, the position and orientation range, and associate the predefined ranges with the virtual content.

Furthermore, the AR application in the viewing device 101 and the server 110 can subsequently modify the originally authored virtual content and generate additional content (e.g., additional virtual content) corresponding to the factory machine 114. If the factory machine 114 is not recognized locally at the viewing device 101, the viewing device 101 downloads additional information (e.g., a three-dimensional model of the factory machine based on detected feature points) corresponding to the factory machine 114, from a database of the server 110 over the network 108.

In another example embodiment, the tracking sensors 112 may be used to track the location and orientation of the viewing device 101 externally without having to rely on the sensors internal to the viewing device 101. The tracking sensors 112 may include optical sensors (e.g., depth-enabled 3D camera), wireless sensors (Bluetooth, Wi-Fi), GPS sensor, and audio sensor to determine the location of the user 102 wearing the viewing device 101, the distance of the user 102 to the tracking sensors 112 in the physical environment (e.g., sensors placed in corners of a venue or a room), the orientation of the viewing device 101 based on a visual marker or indicator on the viewing device 101.

In another example embodiment, data from the tracking sensors 112 and internal sensors in the viewing device 101 may be used for analytics data processing at the server 110 for analysis on usage and how the user 102 interacts with the factory machine 114. Examples of analytics data may include the locations (e.g., feature points) on the physical object the user 102 has viewed, how long the user 102 has looked at each location on the physical object, which video clips or footage have been viewed, and how long the user 102 has watched the video clip.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 9, 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., the server 110), databases, and devices (e.g., viewing device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
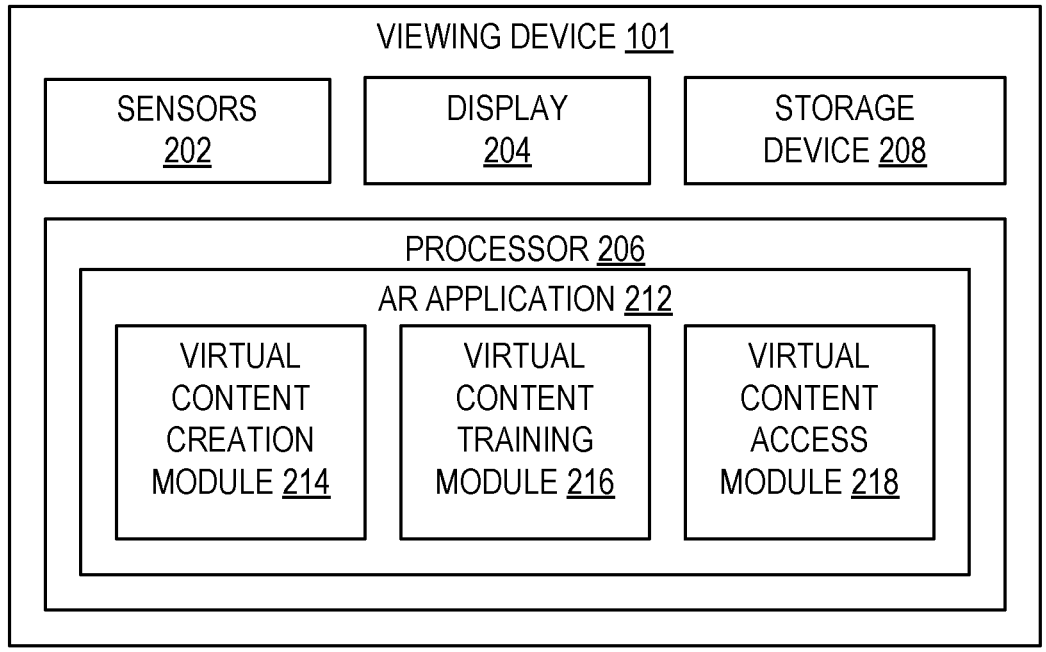
FIG. 2 is a block diagram illustrating an example embodiment of modules (e.g., components) of a viewing device.

FIG. 2 is a block diagram illustrating an example embodiment of modules (e.g., components) of the viewing device 101. The viewing device 101 may include sensors 202, a display 204, a processor 206, and a storage device 208. The viewing device 101 may be a wearable computing device such as a smart helmet. The viewing device 101 may also be referred to as a HMD.

The sensors 202 may include, for example, a proximity or location sensor (e.g., Near Field Communication, GPS, Bluetooth, Wi-Fi), an optical sensor (e.g., camera, depth sensors), an orientation sensor (e.g., gyroscope, Inertial Measurement Unit), an audio sensor (e.g., a microphone), or any suitable combination thereof. For example, the sensors 202 may include rear facing cameras and front facing cameras in the viewing device 101. It is noted that the sensors 202 described herein are for illustration purposes and that the sensors 202 are not limited to the ones described. The sensors 202 may be used to generate internal tracking data of the viewing device 101 to determine what the viewing device 101 is capturing or looking at in the real physical world.

The display 204 may include, for example, a transparent or a see-through display so that the user can see through the display 204 (e.g., Head-Up Display). The display 204 includes a screen or monitor configured to display images generated by the processor 206. The display 204 may be included and formed in lenses of the HMD. The lenses may be positioned adjacent to the eyes of the wearer of the HMD so that the lenses are in the light of sight of the wearer.

The viewing device 101 may include an augmented reality (AR) application 212, executing on the processor 206, for creating and generating virtual content. The virtual content may be displayed when the viewing device 101 is within predefined conditions associated with the virtual content and the corresponding physical object. An example of predefined conditions may be displaying video clip A when in room B between the hours of 10 μm and 6 am, when temperature of machine C is above x degrees. In one example embodiment, the AR application 212 may include a virtual content creation module 214, a virtual content training module 216, and a virtual content access module 218.

Figure 3:
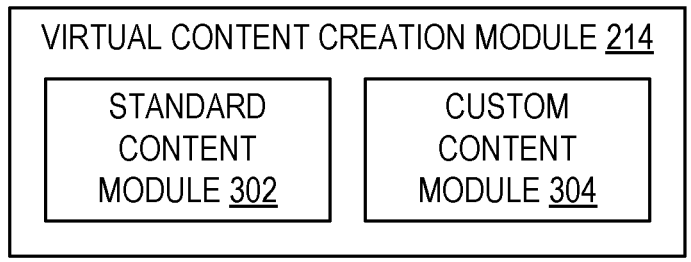
FIG. 3 is a block diagram illustrating example modules of a virtual content creation module.

The virtual content creation module 214 enables the user of the viewing device 101 to create virtual content related to a physical object. For example, the virtual content may include information related to the physical object (e.g., video or audio description of how to operate the physical object, animation showing virtual arrows around the physical object with a corresponding audio description). The user may create this virtual content using the viewing device 101 without having to use a client device such as a desktop or laptop computer. FIG. 3 is a block diagram illustrating example modules of the virtual content creation module 214.

The virtual content creation module 214 may include a standard content module 302 and a custom content module 304. The standard content module 302 may include a standard template related to the type of physical object (e.g., a drilling machine, a heating machine). For example, the standard template may include a factory name, a machine name, authorized operators of the machine, and a description of an operation being demonstrated on the machine (e.g., how to repair the machine, how to operate the machine). The standard template may be associated with physical objects having similar characteristics, such as location, operators, and type of machine. Consequently, machines located within a same plant may share the same content template.

The user of the viewing device 101 may then select a standard template based on the type of machine (e.g., drilling or heating machine) or the type of information that needs to be provided (e.g., maintenance cleaning, regular operation, diagnostic operation, or repair). Selection of the standard template may be accomplished via a variety of inputs such as audio commands, touch input on a surface of the viewing device 101, predefined visual gestures detected by internal sensors 202, external sensors 112, or a combination thereof. The standard template may be displayed in the display 204 of the viewing device 101. In one example embodiment, upon selection of the standard template, the virtual content creation module 214 generates audio and/or visual cues for the user to "fill out" the standard template. For example, the viewing device 101 may generate a series of audio prompts for the user to provide content. An example of an audio prompt may include "Please name the machine you are looking at." The user may reply by saying the name of the machine (e.g., "floor drilling machine B") and speech recognition may then be used to identify the user's vocal response. The next audio prompt may be "repair or operation?" In response to an "operation" reply from the user, the virtual content creation module 214 may start recording a video, using a camera of the viewing device 101, of the user operating the machine. In another example, in response to the "operation" vocal reply from the user, the virtual content creation module 214 tracks feature points of the machine (or any apparatus) to determine components of the machine that are being or have been moved during a normal operation of the machine. For example, the virtual content creation module 214 may track a flipping of a switch by tracking predefined feature points on the physical switch. In an example embodiment, the virtual content creation module 214 automatically generates an animation of a three-dimensional model of the switch behind flipped corresponding to the tracked predefined points. In another example embodiment, the virtual content creation module 214 generates a three-dimensional model of an arrow being animated to show the switch direction. In yet another example embodiment, the location changes of the feature points may be tracked and communicated to a remote server that generates an animation of a three-dimensional virtual object based on the changes in the feature points. In yet another example embodiment, the video of the user flipping the switch may be communicated to a remote server that generates the animation based on an analysis of the video.

The custom content module 304 allows the user to customize a template by introducing different categories of content from the standard template. Accordingly, in a custom mode, the user does not follow particular prompts predefined in a standard template. For example, instead of providing a name of a machine, a description, a location, and a demonstration of an operation of the machine, the user can just provide a video clip in the custom template (as opposed to a predefined template that dictates information to be provided by the user). For example, the custom template may include the video clip and corresponding predefined conditions. An example of a predefined condition is when the temperature of a factory machine exceeds a temperature threshold or when the viewing device 101 is positioned in a particular location and orientation with respect to the factory machine 114. Selection of the custom template may be similarly accomplished via audio commands, touch input on a surface of the viewing device 101, predefined visual gestures detected by internal sensors 202, external sensors 112, or a combination thereof. In one example embodiment, upon selection of the custom template, the virtual content creation module 214 generates audio and/or visual cues for the user to define the custom template. For example, the viewing device 101 may generate a series of audio prompts for the user to provide categories for the custom template. An example of an audio prompt may include "Please define a first category for your custom content." The user may reply with "machine ID" and speech recognition may then be used to identify the user's vocal response. The next audio prompt may be "Please define a second category for your custom content." The user may reply with "video demonstration of a repair" and speech recognition may then be used to identify the user's vocal response. The "video demonstration" may be keyword that triggers the viewing device 101 to prompt: "please say 'record' when you are ready and 'stop' when you are finished." In response to a "record" vocal reply from the user, the virtual content creation module 214 may start recording a video of the user repairing the machine. The user can further customize the custom template by specifying a predefined conditions category under which the video clip is to be played. Examples of predefined conditions include a location and position of the viewing device 101 while the viewing device 101 is recording the user repairing the machine. Therefore, a video clip showing a user fixing a front panel of factory machine may be triggered when the viewing device 101 is facing the front panel of the factory machine 114. In the same manner, when the user on the left side of the factory machine 114 looking down, a video clip corresponding to the location of the user and the orientation is retrieved and displayed.

Figure 4:
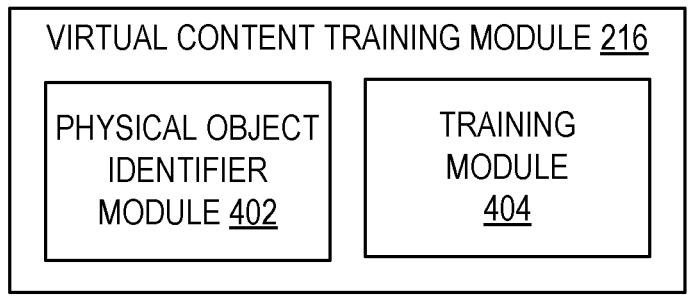
FIG. 4 is a block diagram illustrating example modules of a virtual content training module.

Referring back to FIG. 2, the virtual content training module 216 allows the user of the viewing device 101 to train the augmented reality application 212 to associate the virtual content, created with the virtual content creation module 214, with the corresponding physical object viewed by the viewing device 101. FIG. 4 is a block diagram illustrating example modules of the virtual content training module 216. The virtual content training module 216 is shown by way of example to include a physical object identifier module 402 and a training module 404.

The physical object identifier module 402 may detect, generate, and identify identifiers such as feature points of the physical object being viewed using the viewing device 101. Based on the identifiers, the physical object identifier module 402 may identify a physical object. However, because machines may resemble one another on a factory floor, the physical object identifier module 402 may use tracking data (e.g., unique feature points, a quick response (QR) code displayed on a machine, a serial number, or the like) to further assist in identifying the unique physical object. After the physical object identifier module 402 determines the identifiers of the physical object, the physical object identifier module 402 accesses a local library of physical objects information and corresponding identifiers in the storage device 208 (or in a library stored in a remote server or on another viewing device). The physical object identifier module 402 compares the identifiers of the physical object to identifiers in the library in the storage device 208 and retrieves an identification of a corresponding physical object. For example, the physical object identifier module 402 identifies the QR code on the factory machine 114, compares the QR code to a library of QR codes in the storage device 208, and retrieves an identification of the factory machine 114. The identification of the factory machine 114 may include information that uniquely identifies the factory machine 114. Examples of information include a serial number, a tag number, location information or coordinate, or any unique identifier associated with the factory machine 114. Other information about the factory machine 114 may be included in the identification information. For example, the make, model, operating status, type of factory machine, related factory machines, factory machines connected to the factory machine 114 may be included in the identification information. In another example embodiment, the physical object identifier module 402 displays the identification of the factory machine and requests a confirmation to the wearer of the viewing device 101 to confirm the identification of the factory machine 114.

In another example embodiment, the physical object identifier module 402 determines a geographic location of the user wearing the viewing device 101 using sensors 202 internal to the viewing device 101 or sensors 112 external to the viewing device 101, or a combination thereof. The physical object identifier module 402 accesses a library of physical objects information and corresponding geographic locations in the storage device 208 (or in a library stored in a remote server or on another viewing device). The physical object identifier module 420 compares the determined geographic location of the viewing device 101 with the geographic locations in the library in the storage device 208 and retrieves an identification of the corresponding physical object. For example, the physical object identifier module 402 identifies that the viewing device 101 is located at a specific GPS coordinate, compares the specific GPS coordinate to a library of GPS coordinates in the storage device 208, and retrieves a corresponding identification of the factory machine 114.

The training module 404 trains the augmented reality application 212 to associate an identification of the factory machine 114 as determined by the physical object identifier module 402 with the virtual content generated with the virtual content creation module 214. For example, the training module 404 creates an association link in a library database between virtual content A and identifier A of machine A. In other example embodiments, the training module 404 accesses and retrieves virtual content associated a geographic location of the factory machine 114 based on a geographic location of the viewing device 101. The training module 404 also retrieves the identification of the factory machine 114 based on the geographic location of the viewing device 101. Subsequently, the training module 404 associates the virtual content based on the geographic location of the factory machine 114 with the identification of the factory machine 114 based on the geographic location of the viewing device 101 when the virtual content was created.

In other examples, the training module 404 determines that virtual content is associated with a specific type of machine (e.g., a drill). The training module 404 determines from the identification information of the factory machine 114 as determined by the physical object identifier module 402 that the factory machine 114 is also a drill. Consequently, the training module 402 associates the virtual content associated with the specific type of machine with the identification of the factory machine 114 based on their common type of machine. Other combinations or permutations of different associations between virtual content and machines may be performed based on machine brand, model, location, usage, technology or other attributes or parameters.

In another example embodiment, the training module 404 generates a library of predefined conditions and corresponding virtual content. The predefined conditions may include viewing device predefined conditions related to the viewing device 101 and physical object predefined conditions related to the factory machine 114. The viewing device predefined conditions may be based on a state of the viewing device 101 at the time of recording during operation of the virtual content creation module 214. Examples of viewing device predefined conditions may include a geographic location of the viewing device 101 at the time of recording, a distance or range of distances between the viewing device 101 and the factory machine 114 at the time of recording, a position and orientation of the viewing device 101 as determined by sensors 202 in the viewing device 101 at the time of recording. Other examples of viewing device predefined conditions may include a state of the wearer of the viewing device 101. Example of states of the wearer may be a calm user state, an agitated user state, or a nervous user state. The state of the wearer may be identified using sensors (e.g., heart monitor) connected to the wearer. The wearer of the viewing device 101 may also select the state of the wearer to be included in the viewing device predefined conditions. Examples of physical object predefined conditions may include an operating status of the physical object (e.g., normal status, defective status) and a geographic location of the physical object (e.g., GPS coordinates). The physical object predefined conditions may also be based on a state of the physical object (e.g., the operating status and geographic location of the physical object) at the time of recording during operation of the virtual content creation module 214.

Figure 5:
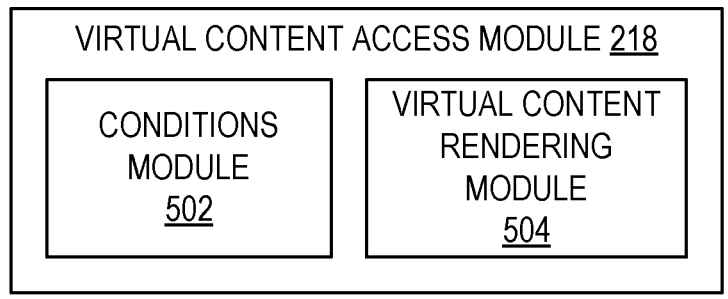
FIG. 5 is a block diagram illustrating example modules of a virtual content rendering module.

Referring back to FIG. 2, the virtual content access module 218 generates a visualization of the virtual content based on a combination of feature points of the physical object being viewed by the viewing device 101, and tracking data from sensors 202 internal to the viewing device 101 and tracking sensors 112 external to the viewing device 101. The virtual content access module 218 may be used to retrieve virtual content that was originally created on the viewing device 101 or on another viewing device. FIG. 5 is a block diagram illustrating example modules of the virtual content access module 218. The virtual content access module 218 is shown by way of example to include conditions module 502 and a virtual content rendering module 504.

The conditions module 502 detects current conditions associated with the viewing device 101 and the factory machine 114. Examples of current conditions include an identification of a physical object being viewed by the viewing device 101 and data tracking related to the viewing device 101 while viewing the physical object. The conditions module 502 may use the physical object identifier module 402 to detect the identification of the physical object presently being viewed the viewing device 101. The conditions module 502 may use the sensors 202 of the viewing device 101 and tracking sensors 112 external to the viewing device 101 to determine a present state (e.g., geographic location, position, orientation, and movement) of the viewing device 101. Furthermore, the conditions module 502 may communicate with the server 110 or directly with the factory machine 114 to determine a current operating status (e.g., normal operation, defective, overheated, specific error code) of the factory machine 114. Therefore, the current conditions include a combination of information based on the identification of the factory machine 114, the present state of the viewing device 101, and the current operating status of the factory machine 114.

The conditions module 502 may further retrieve predefined conditions from a library of predefined conditions stored in the storage device 208 or in the server 110. As previously described with respect to FIG. 4, the virtual content training module 216 stores predefined conditions and corresponding virtual content in the library of predefined conditions in the storage device 208. The library of predefined conditions and corresponding virtual content or portions of the library can also be uploaded to the server 110 or to another viewing device. The conditions module 502 accesses the library of predefined conditions and compares the current conditions associated with the viewing device 101 and the factory machine 114 with the predefined conditions in the library of predefined conditions in the storage device 208. In one example embodiment, the conditions module 502 accesses predefined conditions based in part on a combination of an identification of the factory machine 114, a geographic location of the viewing device 101, a present state of the viewing device 101, a current operating status of the factory machine 114. For example, a predefined condition C includes an identification of the factory machine 114 (e.g., machine M), a predefined distance range between the viewing device 101 and the factory machine 114 (e.g., 2 to 3 feet), geographic location information of the viewing device 101 (e.g., GPS coordinates), an error operating status of the factory machine 114 (e.g., malfunction X). Virtual content V includes a video footage or animation of virtual objects showing how to repair malfunction X is associated with the predefined condition C. The conditions module 502 compares the predefined condition C with the current conditions associated with the viewing device 101 and the factory machine 114. The conditions module 502 may be configured to retrieve the virtual content associated with the predefined condition C in response to a combination of the current conditions associated with the viewing device 101 and the factory machine 114 matching the predefined conditions. For example, the conditions module 502 may be configured to retrieve the virtual content when all of the current conditions associated with the viewing device 101 and the factory machine 114 match the predefined conditions. Therefore, the conditions module 502 retrieves the virtual content V only when the viewing device 101 is viewing machine M at a distance of 2 feet of the machine M, and machine M exhibits malfunction X. In another example, the conditions module 502 may be configured to retrieve the virtual content when at least one of the current conditions associated with the viewing device 101 and the factory machine 114 match the predefined conditions. Therefore, the conditions module 502 retrieves the virtual content V when the viewing device 101 is viewing machine M at a distance of 5 feet of the machine M, and machine M exhibits a normal operating status. In yet another example, the conditions module 502 retrieves all virtual content associated with the machine M regardless of the operating status of the machine M.

Once the conditions module 502 retrieves the virtual content, the conditions module 502 provides the virtual content to the virtual content rendering module 504. In one example embodiment, the conditions module 502 refers the virtual content rendering module 504 to the relevant virtual content locally stored in the storage device 208. In another example embodiment, the conditions module 502 refers the virtual rendering module 504 to the relevant virtual content remotely stored in the server 110.

The virtual content rendering module 504 generates a visualization of the virtual content in the display 204. In one example embodiment, the virtual content rendering module 504 renders an animated three-dimensional object based on a three-dimensional model or displays a video footage, or a combination thereof. The virtual content rendering module 504 renders the virtual content to be displayed in relation to a line of sight between the eyes of the wearer of the viewing device 101 and the physical object being viewed by the wearer of the viewing device 101 through the display 204 of the viewing device 101. In another example embodiment, the virtual content rendering module 504 displays the virtual content in the display 204 based on a position of the display 204 of the viewing device 101 in relation to the physical object being viewed by the viewing device 101. For example, if the display 204 is oriented towards the left side of the physical object when the wearer of the viewing device 101 looks at the left side of the physical object, the virtual content rendering module 504 renders the virtual content on the right side of the display 204 to compensate keep the virtual content within the display 204.

In one example embodiment, the virtual content rendering module 504 accesses a video file from the virtual content referred to by the conditions module 502. The virtual content rendering module 504 generates a video footage in the display 204. The size of the video footage may be adjusted and reduced to a portion of the display 204 so as not to entirely block a view of the wearer of the viewing device 101. For example, the video footage may be displayed in an upper corner of the display 204. In another example embodiment, the video footage may be displayed substantially over the entire surface of the display 204. The virtual content rendering module 504 may play the video file and pause playback in response to a command from a user interface (e.g., user taps at a specific location on the viewing device 101 or says "pause" or "stop"). The virtual content rendering module 504 may pause playback of the video file when the wearer of the viewing device 101 turns away from viewing the physical object. The virtual content rendering module 504 may resume playback of the video file when the wearer of the viewing device 101 turns back to view the physical object after a preset duration.

In another example embodiment, the virtual content rendering module 504 accesses a three-dimensional model of a virtual object from the virtual content referred to by the conditions module 502. For example, the three-dimensional model may be a virtual arrow or specific effects (e.g., sparks) to guide the user of the viewing device 101 on how to operate or repair the physical object. The three-dimensional model may be assigned to a specific feature point (e.g., upper left corner of the physical object). Consequently, the three-dimensional model of a virtual object "follows" the specific feature point. For example, the virtual content rendering module 504 renders a virtual arrow that floats above a switch. The virtual arrow can be animated to further gain the user's attention on toggling the switch in a suggested direction. The virtual arrow is displayed next to the switch regardless of the position and orientation of the viewing device 101.

Each animation or virtual objects from the virtual content may be triggered based on the state of the physical object. For example, the virtual content rendering module 504 may display a first virtual arrow above a first switch of the physical object. After the user flips the first switch in the direction indicated by the first arrow, the first virtual arrow disappears from the display 204 and the virtual content rendering module 504 displays a second virtual arrow above a lever of the physical object. Consequently, the virtual content rendering module 504 displays portions of the virtual content in the display 204 in a sequence based the user's manipulation on the physical object.

The shape, size, color, or appearance of the virtual content may change based on the position and orientation of the viewing device 101 relative to the physical object being viewed. For example, the virtual content may appear bigger as the viewing device 101 moves closer to the physical object associated with the virtual content. Similarly, the color of the virtual content may change based on a current state of the physical object (e.g., red for malfunction, green for normal operation).

The virtual content generating module 504 may include a local rendering engine that generates a visualization of a three-dimensional virtual object overlaid (e.g., superimposed upon) in a display in a line of sight of the physical object. Cameras in sensors 202 can determine the line of sight of the viewing device 101. Gyroscope, compass, IMUs may be used to determine a position and orientation of the viewing device 101, and therefore a line of sight from the viewing device 101. The line of sight may extend perpendicular to the display 204 of the viewing device 101. The virtual content generating module 504 therefore manipulates a view of the three-dimensional virtual object based on a position of the physical object relative to the camera of the viewing device 101. For example, the virtual content generating module 504 displays the three-dimensional virtual object from different angles based on position of the camera of the viewing device 101 moving around the physical object.

Referring back to FIG. 2, the storage device 208 may be configured to store a library or a database of virtual content, corresponding predefined conditions including predefined conditions of viewing devices and predefined conditions of physical objects. In another example embodiment, the database may also include physical object identifiers such as visual references. Examples of visual references include a machine-readable code on a factory machine M. The machine-readable code may correspond to a three-dimensional virtual model of the factory machine M that can be viewed from different angles by manipulating the position of the viewing device 101 relative to the machine-readable code.

In one example embodiment, the storage device 208 includes a primary content dataset and a contextual content dataset. The primary content dataset includes, for example, a first set of identifying feature points and corresponding virtual content. For example, identifying feature points may be associated with one or more virtual object models. The primary content dataset may include a core set of identifying feature points or the most popular identifying feature points determined by the viewing device 101 or by the server 110. The core set of identifying feature points may include a limited number of identifying feature points identified by the viewing device 101 or by the server 110. For example, the core set of identifying feature points may include the identifying feature points depicting the most viewed or used machines and their corresponding virtual content. In another example, the server 110 may generate the first set of identifying feature points based on the most popular or often scanned identifying feature points (e.g., of most often viewed machines) received at the server 110. In yet another example, the primary content dataset includes the first set of identifying feature points and corresponding virtual content from machines that often have the most malfunctions, from machines that are based in at a location (e.g., machines from factory region R), from machines of a same manufacturer, from machines from which a user of the viewing device 101 has exclusive access, from machines most often operated by the user of the viewing device 101, or from machines assigned to the user of the viewing device 101 based on a job or title description.

The contextual content dataset includes, for example, a second set of identifying feature points and corresponding virtual content retrieved from the server 110. For example, identifying feature points captured with the viewing device 101 that are not locally recognized in the primary content dataset are submitted to the server 110 for recognition. If the captured identifying feature points are recognized by the server 110, the corresponding virtual content may be downloaded at the viewing device 101 and stored in the contextual content dataset of the viewing device 101. Thus, the contextual content dataset relies on the context in which the viewing device 101 is being used, unlike the primary content dataset which may be preloaded on viewing device 101. As such, the contextual content dataset depends on objects or identifying feature points scanned by the physical object identifier module 402 of the viewing device 101.

In one example embodiment, the viewing device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the viewing device 101).

Any one or more of the modules described herein may be implemented using hardware (e.g., a processor of a machine) or a combination of hardware and software. For example, any module described herein may configure a processor to perform the operations described herein for that module.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 6:
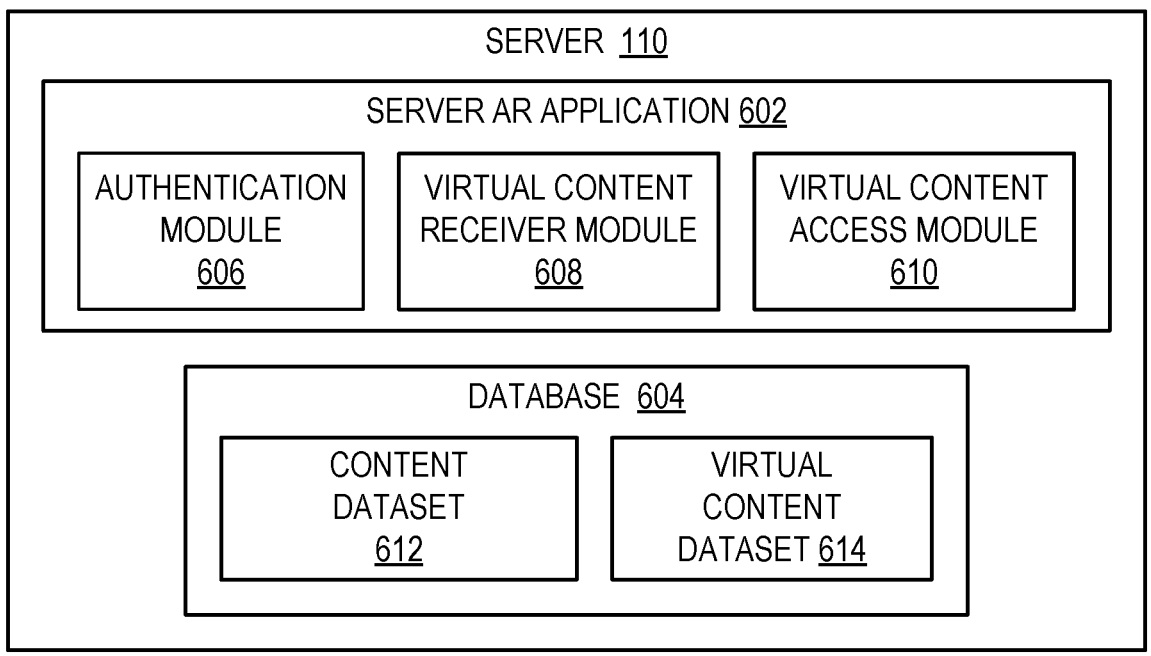
FIG. 6 is a block diagram illustrating example modules executing on one or more processors of a server.

FIG. 6 is a block diagram illustrating example modules (e.g., components) executing on one or more processors of the server 110. The server 110 is shown by way of example to include a server AR application 602 and a database 604. The server AR application 602 may receive virtual content from the viewing device 101 and other viewing devices. In another example embodiment, the server AR application 602 may provide virtual content to the viewing device 101 and other viewing devices. The server AR application 602 is shown by way of example to include an authentication module 606, a virtual content receiver module 608, and a virtual content access module 610.

The authentication module 606 authenticates viewing devices attempting to upload virtual content to the server 110 or download virtual content from the server 110. For example, the authentication module 606 uses biometric information from users of the respective viewing devices. The authentication module 606 receives biometric information from a viewing device and compares the received biometric information with a library of biometric information. Once the authentication module 606 matches the biometric information with the biometric information from the library, the user associated with the corresponding biometric information is authenticated and can upload or download virtual content to and from the database 604 of the server 110. In one example embodiment, users may have different types of access privileges based on their access status. For example, an admin user may be granted full access to all virtual content in the database 604. Some users may have limited upload privilege while others may have limited download privilege. In other example embodiments, a user may have download privilege to virtual content relevant to their job status. For example, a technician working on a drill machine may have access to all virtual content related to drill machines. Similarly, a user may have limited upload privilege for virtual content relevant to a job status. For example, a technician having access privilege to machines A, B, and C may upload virtual content only with respect to those machines A, B, and C.

Once the authentication module 606 authenticates the user of the viewing device 101, the server AR application 602 proceeds with receiving virtual content from the authenticated viewing device with the virtual content receiver module 608 and providing access to virtual content stored in the database 604 with virtual content access module 610.

The virtual content receiver module 608 receives virtual content authored at the viewing device 101. For example, the virtual content receiver module 608 receives, from the viewing device 101, virtual content associated with a physical object and predefined conditions related to the physical object and the viewing device 101. As previously described, the virtual content may include a three-dimensional model of a virtual object, a video clip, or any other multimedia item. In one example embodiment, the virtual content receiver module 608 may receive, in addition to the virtual content, an identification of a physical object, a geographic location of the physical object, a location of the viewing device, viewing device predefined conditions, and physical object predefined conditions.

The viewing device predefined conditions may include conditions related to the viewing device associated with the virtual content. Thus, the virtual content may be triggered when current conditions of the viewing device match the viewing device predefined conditions. Examples of viewing device predefined conditions include a time and location of viewing, a position and orientation of the viewing device relative to the physical object. The viewing device predefined conditions may include conditions of the viewing device at the time of recording the user interacting (e.g., operating or fixing) with the physical object.

The physical object predefined conditions may include conditions related to the physical object associated with the virtual content. Thus, the virtual content may be triggered when current conditions of the physical object match the physical object predefined conditions. Examples of physical object predefined conditions include a geographic location of the physical object (e.g., factory F), an operating status of the physical object (e.g., malfunction M), last maintenance operation (e.g., time T), user who performed last operation on the physical object (e.g., user U). The viewing device predefined conditions may include conditions of the physical object at the time of recording the user interacting (e.g., operating or fixing) with the physical object.

The viewing device 101 may generate metadata comprising the identification of the physical object, the viewing device predefined conditions, the physical object predefined conditions and associate the metadata with the virtual content authored at the viewing device 101. The viewing device 101 uploads the virtual content (e.g., video clip or animation of virtual object) and the corresponding metadatata (e.g., identification of physical object related to the video clip, viewing device predefined conditions, physical object predefined conditions) to the virtual content receiver module 608. The virtual content receiver module 608 stores the virtual content and metadata in the database 604.

In one example embodiment, the database 604 includes a content dataset 612 and a virtual content dataset 614. The content dataset 612 stores, for example, an identification of the physical object (e.g., features points of the physical object) and corresponding metadata (e.g., conditions related to when the virtual content is to be rendered in the viewing device) that are associated with the identification of the physical object. As previously described, the metadata may include viewing device predefined conditions, physical object predefined conditions, or a combination thereof. In this example, the content dataset 604 may include a library of identifications of physical objects, a library of viewing device predefined conditions, and a library of physical object predefined conditions previously received from the viewing device 101, other viewing devices, and from a client device of the server 110. For example, a client device may have uploaded an initial library of identifications of physical objects, and corresponding metadata (e.g., viewing device predefined conditions, and physical object predefined conditions) to form an initial content dataset 612 in the database 604.

In other example embodiments, the content dataset 612 may be divided or otherwise organized based on geographic locations of the physical objects. For example, the content dataset 612 may include a subdataset for physical objects located at a particular manufacturing facility. The content dataset 612 may also be organized by privilege access. For example, a senior technician may have access to a larger number of items from the content dataset 612 than a junior technician.

The virtual content dataset 614 stores the virtual content (e.g., three-dimensional model of a virtual object, media clip) received from the viewing device 101 or other viewing devices. The virtual content dataset 614 stores, for example, virtual content that are associated with the identification of the physical object, current conditions of the viewing device or physical object. In this example, the content dataset 604 may include a library of virtual content (e.g., three-dimensional models of virtual objects) previously received from the viewing device 101, other viewing devices, and from a client device of the server 110. For example, the client device may have uploaded an initial library of virtual content to form an initial virtual content dataset 614 in the database 604.

The virtual content access module 610 provides virtual content from the virtual content data 614 to the viewing device 101 or other authenticated viewing devices. The virtual content access module 610 may receive a notification from the viewing device 101 of an identification of a physical object (e.g., using feature points of the physical object). The virtual content access module 610 retrieves the corresponding virtual content associated with the identified physical object and provides the virtual content to the viewing device 101. In another example embodiment, the virtual content access module 610 receives current conditions related to the viewing device 101 and the physical object. For example, the virtual content access module 610 receives a location of the viewing device 101 (e.g., factory F), an operating state of the physical object (e.g., malfunction M), a relative position of the viewing device 101 to the physical object (e.g., viewing device looking at a left side of the physical object), and retrieves the corresponding virtual content based on the received current conditions of the viewing device 101 and the physical object. The virtual content access module 610 sends the corresponding virtual content to the viewing device 101.

Figure 7:
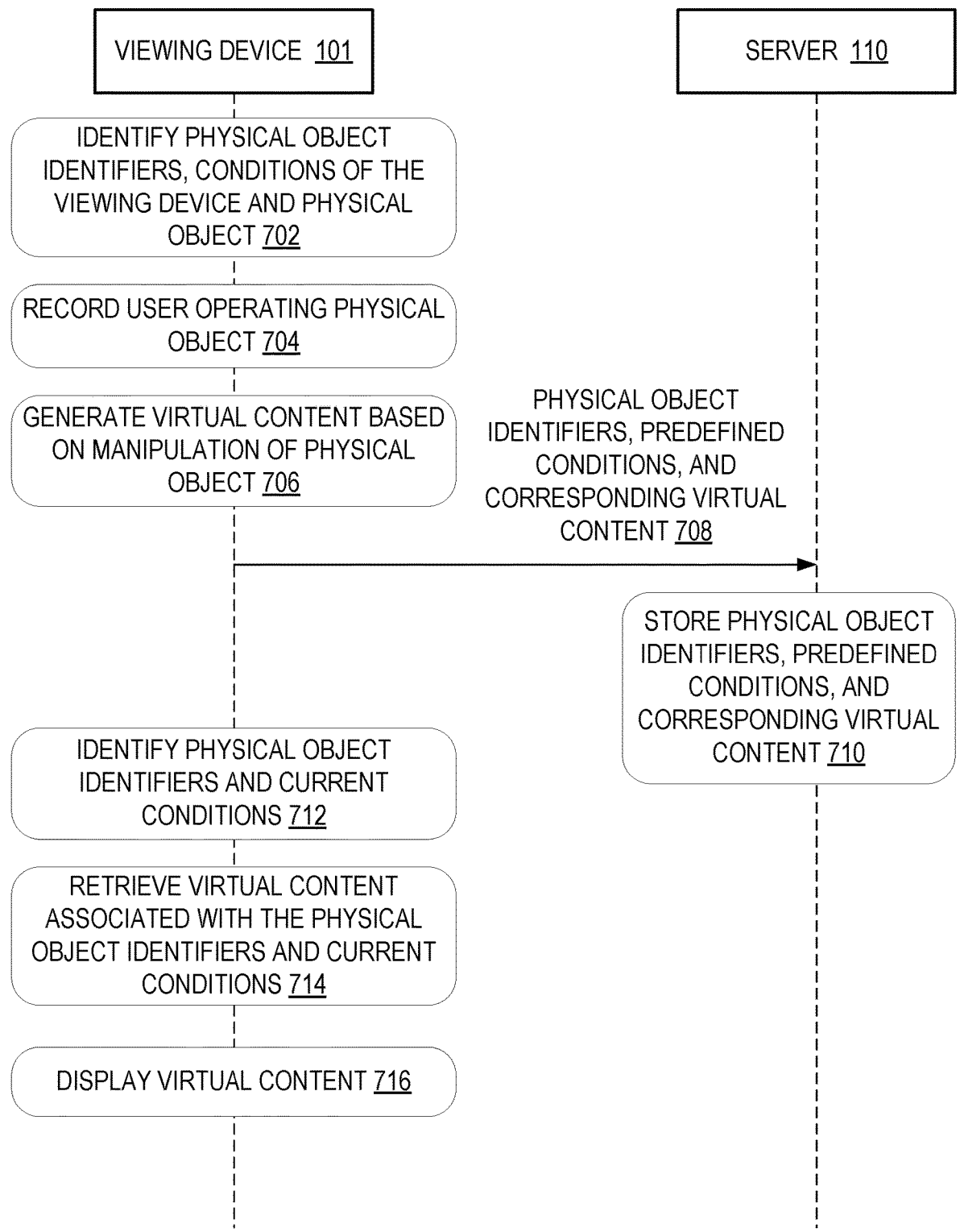
FIG. 7 is an interaction diagram illustrating interactions between a viewing device for creating virtual content and a server.

FIG. 7 is an interaction diagram illustrating interactions between a viewing device for creating virtual content and a server. The interactions may be performed by the viewing device 101 and the server 110 and, accordingly, are described merely by way of example with reference thereto.

At operation 702, the viewing device 101 views a physical object, identifies identifiers of the physical object, and conditions related to the viewing device and the physical object. For example, the viewing device 101 is used to view the factory machine 114. The viewing device 101 may be five feet away from the factory machine 114. The factory machine 114 has a malfunction status. The viewing device 101 identifies feature points (e.g., QR code on the machine), determines that the factory machine 114 is located five feet in front of the viewing device 101, determines that the viewing device 101 is pointed to the front of the factory machine 114, and determines a malfunction status based on an error output displayed on the factory machine 114 (or based on a communication from the factory machine 114 to the viewing device 101 or to the server 110). In response to a command from the user, the viewing device 101 records the user operating on the physical object (see operation 704). For example, the viewing device 101 records the user fixing the factory machine 114 to render the factory machine operational. The viewing device 101 generates virtual content based on the user operating the physical object as shown in operation 706. For example, the viewing device 101 generates a video footage or an animation of a three-dimensional object based on the point of view of the viewing device 101 at the time the user of the viewing device 101 was fixing the factory machine 114. The viewing device 101 associates the virtual content with the identification of the physical object, the conditions of the viewing device 101, and the conditions of the physical object. For example, the viewing device 101 associates the three-dimensional object with feature points of the factory machine 114, the location and orientation of the viewing device 101 relative to the factory machine 114, and the error output displayed on the factory machine 114. The conditions of the viewing device 101 and the conditions of the physical object at the time the user operated on the physical object may be defined as predefined conditions of the viewing device and physical object. Operation 706 may be implemented using the virtual content creation module 214 and virtual content training module 216.

The viewing device 101 stores the physical object identifiers, predefined conditions of the viewing device 101, predefined conditions of the physical object, and authored virtual content in a local storage (e.g., storage device 208) of the viewing device 101. In another example embodiment, the viewing device 101 communicates the physical object identifiers, predefined conditions of the viewing device 101, predefined conditions of the physical object, and authored virtual content to the server 110 (see operation 708). In one example implementation, the viewing device 101 communicates with the virtual content receiver module 608 of the server 110. The server 110 stores the physical object identifiers, predefined conditions of the viewing device 101, predefined conditions of the physical object, and authored virtual content in the database 602 as shown in operation 710. For example, the server 110 may store the physical object identifiers, predefined conditions of the viewing device 101, and predefined conditions of the physical object in the content dataset 612 in the database 602. The corresponding authored virtual content may be stored in the virtual content dataset 614 in the database 602.

At a later time, the viewing device 101 may be used to view the same physical object (e.g., factory machine 114) at operation 712. The viewing device 101 identifies identifiers of the physical object, and conditions related to the viewing device and the physical object at that later viewing time. For example, the viewing device 101 identifies feature points of the factory machine 114, determines the relative position and orientation of the viewing device 101 with respect to the factory machine 114, and determines an operation status based on an output displayed on the factory machine 114. These conditions at the later time may be referred to as current conditions. Operation 712 may be implemented with the conditions module 502 from the virtual content access module 218 of the viewing device 101.

Subsequently, at operation 714, the viewing device 101 retrieves, from a local memory (e.g., storage device 206), the virtual content associated with identifiers of the physical object, conditions related to the viewing device at that later viewing time, conditions related to the physical object at that later viewing time, or a combination thereof. For example, the viewing device 101 retrieves a three-dimensional model of a virtual object (e.g., virtual parts) associated with the factory machine 114. In another example, the viewing device 101 retrieves the three-dimensional model of the virtual object when current conditions of the viewing device 101 match the predefined conditions of the viewing device 101. For example, the viewing device 101 retrieves the three-dimensional model of the virtual object when the viewing device 101 detects that it is viewing the factory machine 114 located five feet away from the viewing device 101. In this example, the three-dimensional model of the virtual object may be retrieved regardless of an operating status of the factory machine 114. In another example, the viewing device 101 retrieves the three-dimensional model of the virtual object (e.g., animated parts or arrow) when the viewing device 101 detects that it is viewing the factory machine 114 located five feet away from the viewing device 101 and that the factory machine 114 has a malfunction. The three-dimensional model of the factory machine 114 may be associated with the specific malfunction of the factory machine 114.

Once the viewing device 101 retrieves the virtual content, the viewing device 101 renders the virtual content in the display 204 as shown in operation 716. For example, the viewing device may generate a video clip, shown from the same point of view of the viewing device 101, showing how to fix the factory machine 114, or render a three-dimensional virtual objects showing which parts are needed to fix the factory machine 114. The viewing device 101 may generate a notification to the user of the viewing device 101 that virtual content is available to be displayed. The notification may further identify that the virtual content is based on the identification of the physical object, current conditions of the viewing device 101, or current conditions of the physical object. For example, the notification may show: "a video clip showing how to operate the drill machine in front of you is available for viewing, say 'play it' to view the video clip", or "machine in front of you is malfunctioning, content showing how to repair is available for viewing, say 'show me how' to view the content." In response to a vocal command from the user, the viewing device 101 displays the corresponding virtual content in the display 204. Operation 716 may be implemented with the virtual content rendering module 504 of the virtual content access module 218 of the viewing device 101.

Figure 8:
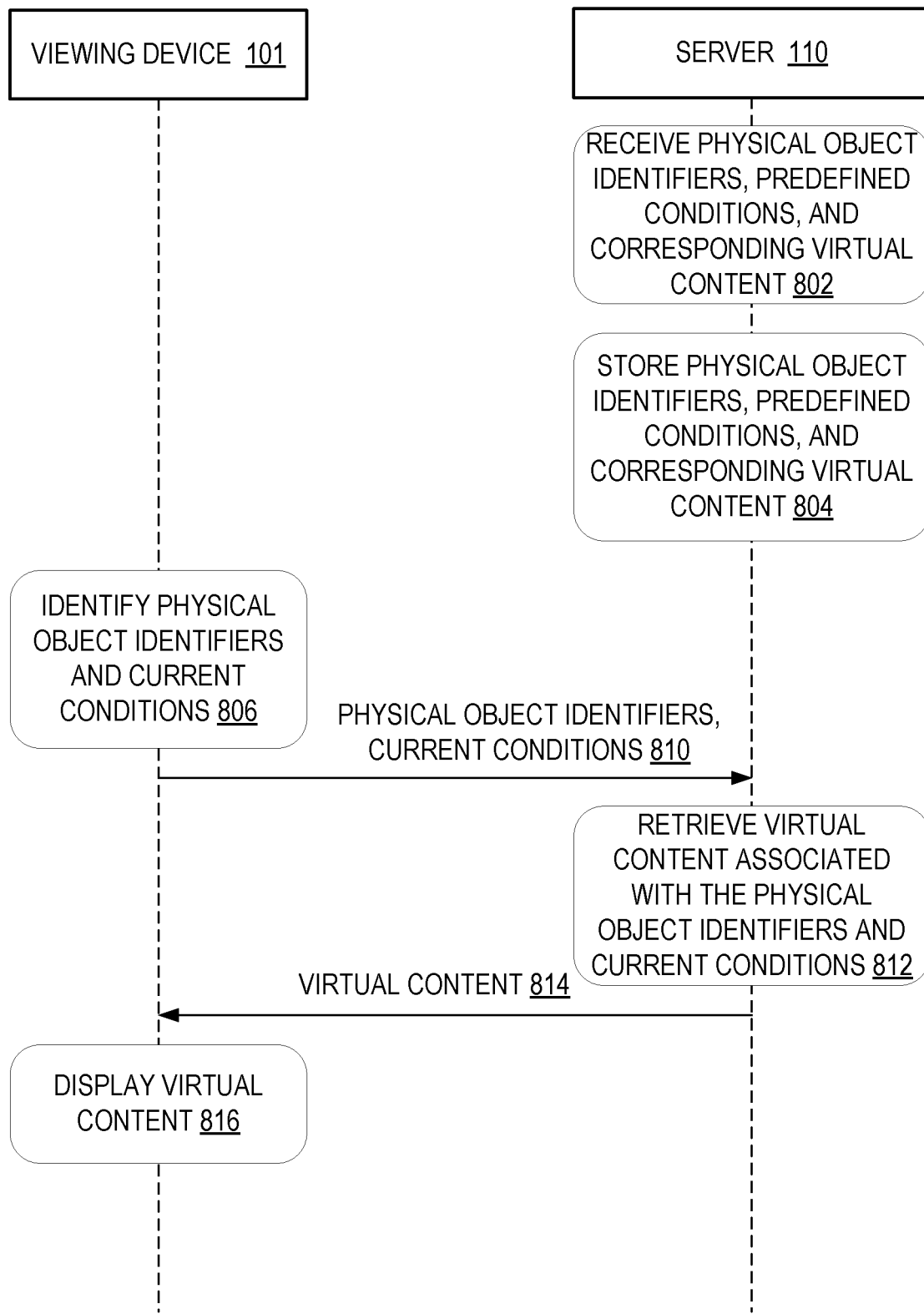
FIG. 8 is an interaction diagram illustrating interactions between a viewing device for accessing virtual content and a server.

FIG. 8 is an interaction diagram illustrating interactions between a viewing device for accessing virtual content and a server. The interactions may be performed by the viewing device 101 and the server 110 and, accordingly, are described merely by way of example with reference thereto.

At operation 802, the server 110 receives physical object identifiers, predefined conditions of the viewing device and the physical object, and corresponding authored virtual content from the viewing device 101 or other viewing devices. The server 110 stores the physical object identifiers, predefined conditions of the viewing device and the physical object, and corresponding authored virtual content in the database 604 of the server 110 (as shown in operation 804). For example, the physical object identifiers, predefined conditions of the viewing device and the physical object may be stored in the content dataset 612 of the database 604. The corresponding authored virtual content may be stored in the virtual content dataset 614 of the database 614.

Subsequently, the viewing device 101 may be used to view a physical object (e.g., factory machine 114). At operation 806, the viewing device 101 identifies identifiers of the physical object, and current conditions related to the viewing device and the physical object. Current conditions may refer to conditions (of the viewing device 101 and the physical object) at the time the viewing device 101 views the physical object. For example, the viewing device 101 identifies feature points of the factory machine 114, determines the relative position and orientation of the viewing device 101 with respect to the factory machine 114, and determines a current operation status based on an output displayed on the factory machine 114 at the time the viewing device 101 views the physical object. Operation 806 may be implemented with the physical object identifier module 402 and the conditions module 502 of the viewing device 101.

The viewing device 101 determines whether the identifiers of the physical object and the current conditions match with any identifiers and predefined conditions in the local memory (e.g., local storage device 208). If the viewing device 101 determines that the local memory does not include matching identifiers or predefined conditions, the viewing device 101 communicates the identifiers of the physical object and the current conditions to the server 110 (as shown in operation 810). In one example implementation, the viewing device 101 communicates with the virtual content access module 610 from the server 110 to request for the virtual content associated with the identifiers of the physical object and the current conditions Subsequently, the server 110 retrieves, from the database 604, the virtual content associated with identifiers of the physical object, current conditions related to the viewing device, conditions related to the physical object, or a combination thereof at operation 812. For example, the server 110 retrieves a three-dimensional model of a virtual object (e.g., virtual parts of the physical object) associated with the physical object. In another example, the server 110 retrieves the three-dimensional model of the virtual object when current conditions of the viewing device 101 match the predefined conditions of the viewing device 101 stored in the database 604. For example, the server 110 retrieves the three-dimensional model of the virtual object when the current conditions indicate that the viewing device 101 is located five feet away from the physical object. In this example, the three-dimensional model of the virtual object may be retrieved regardless of an operating status of the physical object. In another example, the server 110 retrieves the three-dimensional model of the virtual object (e.g., animated parts or arrow) when the viewing device 101 detects that it is viewing the physical object located five feet away from the viewing device 101 and that the physical object has a particular malfunction.

Once the server 110 retrieves the virtual content associated with the physical object identifiers or current conditions of the viewing device 101 or of the physical object, the server 110 communicates the virtual content to the viewing device 101 as shown in operation 814. Subsequently, the viewing device 101 renders the virtual content in the display 204 (operation 816). The viewing device 101 may generate the virtual content in a line of sight of the wearer of the viewing device 101 such that the virtual content is perceived as interacting with the physical object. For example, a virtual arrow may be displayed above a corresponding physical component (e.g., an electrical switch). The size, shape, and color of the virtual object may be adjusted based on the position and orientation of the viewing device 101 relative to the physical object. For example, the virtual object may appear larger when the distance between the viewing device and the physical object decreases. Operation 816 may be implemented with the virtual content rendering module 504 of the viewing device 101.

Figure 9:
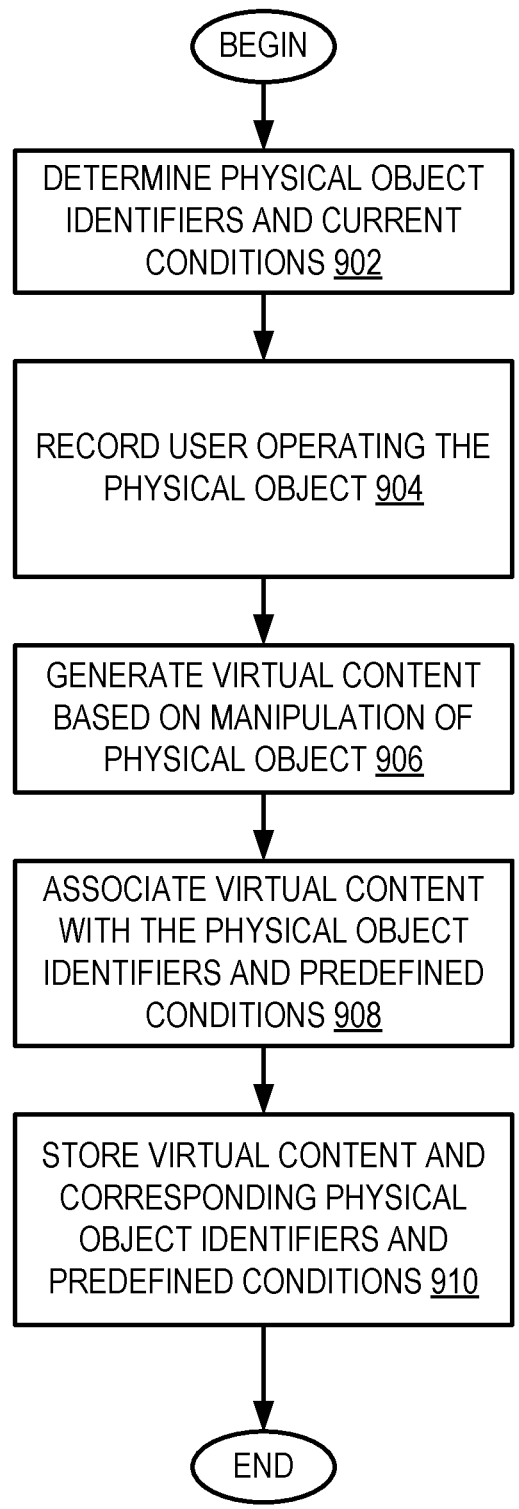
FIG. 9 is a flowchart illustrating an example operation of authoring virtual content from a viewing device for an augmented reality application.

FIG. 9 is a flowchart illustrating an example operation of authoring virtual content from a viewing device (such as viewing device 101) for an augmented reality application. At operation 902, the viewing device 101 is used to view a physical object (such as factory machine 114) and determine physical object identifiers and current conditions associated with the physical object and the viewing device 101. In one example embodiment, sensors 202 in the viewing device 101 may be used to determine a current condition associated with the viewing device 101 while tracking sensors 112 may be used to determine a current condition associated with the factory machine 114. Sensors 202 may also be used to determine a current condition of the factory machine 114 (e.g., detecting flashing red lights from the factory machine 114 or reading an error message on a display of the factory machine 114). Factory machine 114 may also wireless communicate a status message to the server 110 or to the viewing device 101.

At operation 904, the viewing device 101 records the user operating the physical object and conditions changes to the physical object and the viewing device (e.g., position, temperature, orientation). For example, the viewing device 101 may record a video footage of the user fixing the physical object. In another example, the viewing device 101 tracks changes to feature points on the physical object to record changes to the physical object.

The viewing device 101 generates a virtual content based on the user operating the physical object and changes in conditions to the physical object and the viewing device as shown in operation 906. For example, the virtual content may include the video clip and is associated with a malfunction status of the physical object. The changes in conditions show that the physical object was initially defective and is back to operational after the user has operated on the physical object. The viewing device 101 associates the virtual content with the physical object identifiers and predefined conditions. Predefined conditions may include the initial conditions of the physical object or viewing device prior to the user fixing the physical object. In another example embodiment, the predefined conditions may selected by user of the viewing device 101. For example, the user may specify that the virtual content is to be triggered for specific conditions (e.g., during night time operations between 9 pm and 6 am). Operation 906 may be implemented, for example, using the virtual content creation module 214.

Subsequently, the viewing device 101 associates the authored virtual content with the physical object identifiers and predefined conditions (of the viewing device or physical object) at operation 908. In one example embodiment, operation 908 may be implemented using the training module 404.

At operation 910, the viewing device 101 stores the virtual content and corresponding predefined conditions in a local memory (e.g., local storage device 208) or in a remote storage device (e.g., database 604). In one example embodiment, operation 910 may be implemented using the training module 404.

Figure 10:
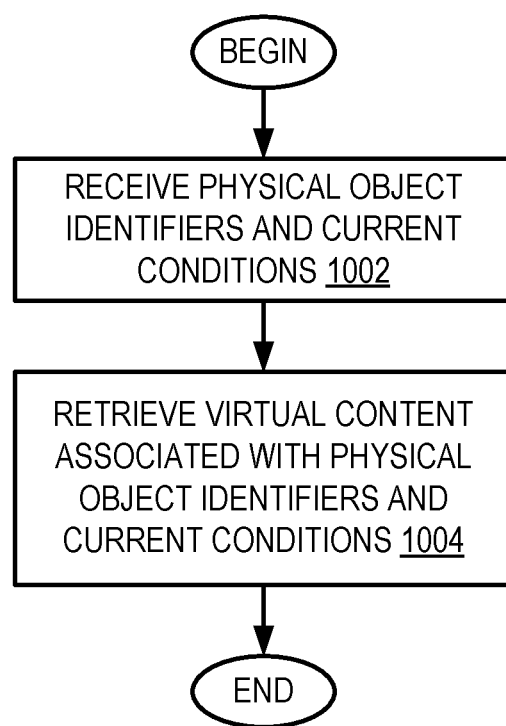
FIG. 10 is a flowchart illustrating an example operation of retrieving a virtual content at a viewing device.

FIG. 10 is a flowchart illustrating an example operation of retrieving a virtual content at a viewing device (e.g., viewing device 101). At operation 1002, the viewing device 101 identifies physical object identifiers and current conditions (related to a physical object or the viewing device 101), and optionally from other viewing devices. For example, the viewing device 101 may determine that another viewing device is experiencing high heat (e.g., temperature above a preset threshold) in a same floor of a factory. Operation 1002 may be implemented using the physical object identifier module 402 and the conditions module 502.

At operation 1004, the viewing device 101 retrieves the corresponding virtual content associated with the physical object and the current conditions of the physical object and the viewing device. For example, the viewing device 101 retrieves evacuation directions in the form of virtual arrows on the floor in response to the other viewing devices experiencing high heat on the same floor of the factory. The viewing device 101 then renders the virtual arrows in the display 204 of the viewing device 101 to show an evacuation route. The retrieval of the virtual content may be implemented at the viewing device 101 by the virtual content access module 218. The display of the virtual arrows may be implemented at the viewing device 101 by the virtual content rendering module 504.

Figure 11:
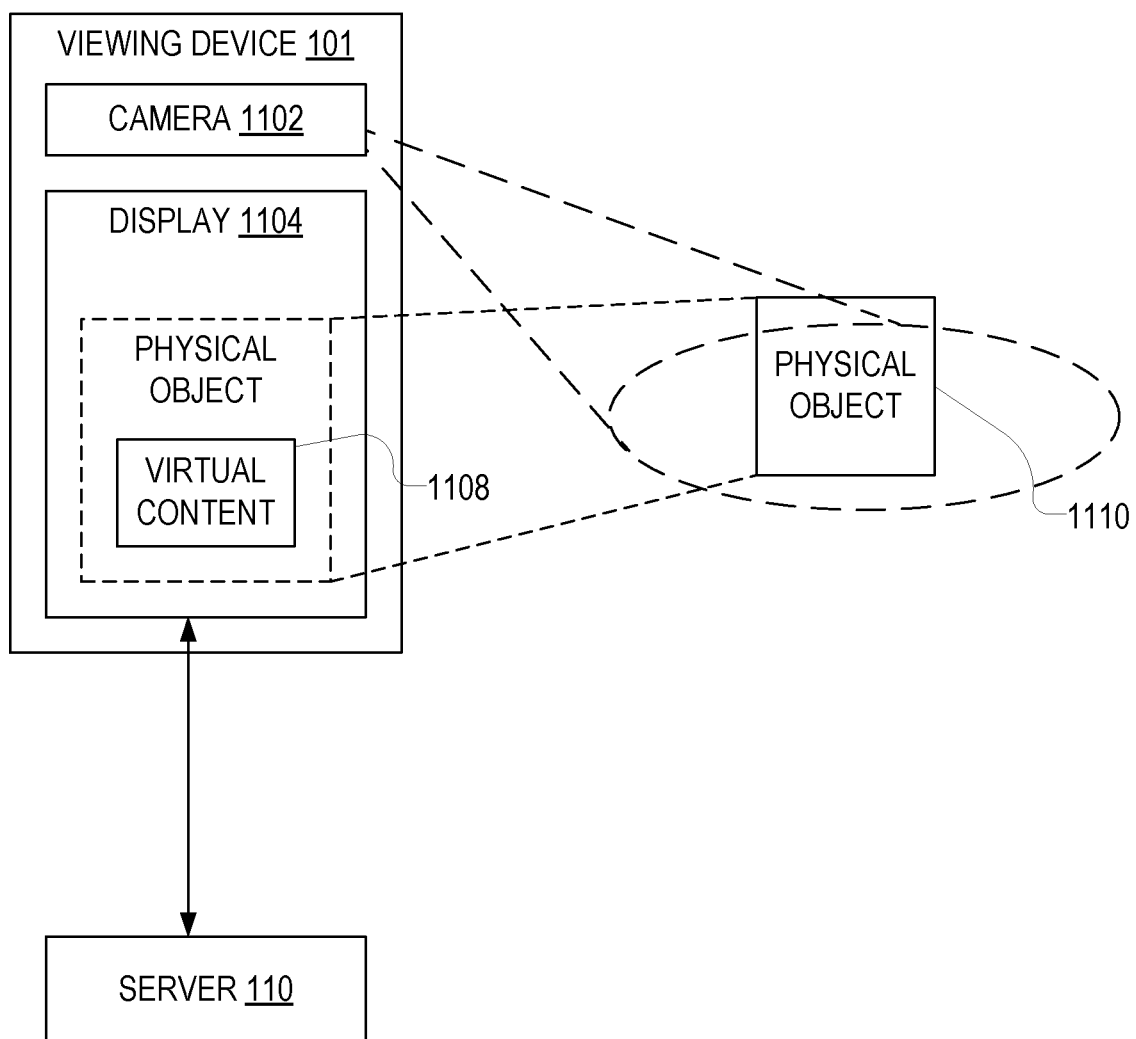
FIG. 11 is a diagram illustrating an example operation for generating virtual content related to a physical object for an augmented reality application at a mobile device.

FIG. 11 is a diagram illustrating an example operation for generating virtual content related to a physical object for an augmented reality application at a mobile device. The viewing device 101 may include a head mounted device having a camera 1102 and a display 1104. The viewing device 101 may be pointed at a physical object 1110. The camera 1102 captures an image of the physical object 1110 and displays virtual content 1108 related to the physical object 1110 (and related to current conditions of the viewing device 101 and/or the physical object 1110) in the transparent display 1104. Identifiers and current conditions related to the physical object 1110 are determined by the viewing device 101 based on a combination of the image of the physical object 1110, ambient conditions of the viewing device 101 (e.g., a location of the viewing device, an ambient temperature of a room where the viewing device is located, an authentication of the user of the viewing device, and other predefined conditions). The user of the viewing device 101 may author virtual content based on a selection of content templates or may create virtual content (e.g., audio/video media, three dimensional models) and associate a selected virtual content to the physical object 1110 and/or current conditions. The selection of the three dimensional model may be performed via a variety of user interfaces (e.g., voice recognition, visual gestures—moving fingers in a predefined geometric pattern). The user thus can specify which virtual content is associated with the physical object 1110 and where to display the selected virtual content 1108 in relation to a view of the physical object 1110 through the display 1104. In another embodiment, the association of the selected virtual content 1108 with the physical object 1110 may be stored at the server 110.

Figure 14:
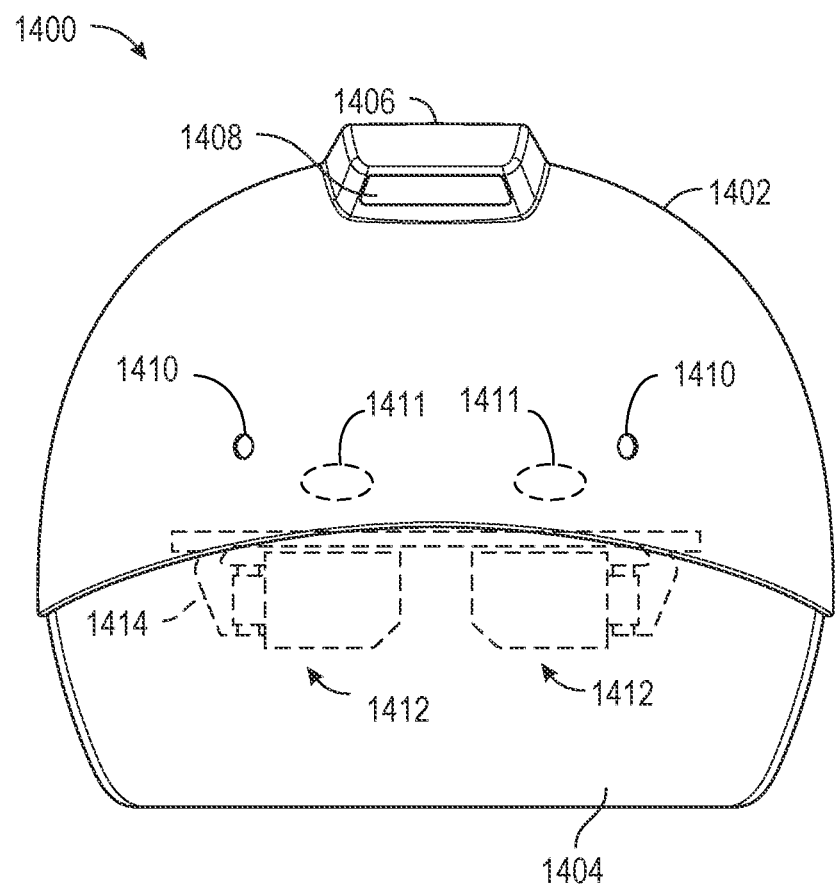
FIG. 14 is a diagram illustrating a front view of a head mounted device.
Figure 15:
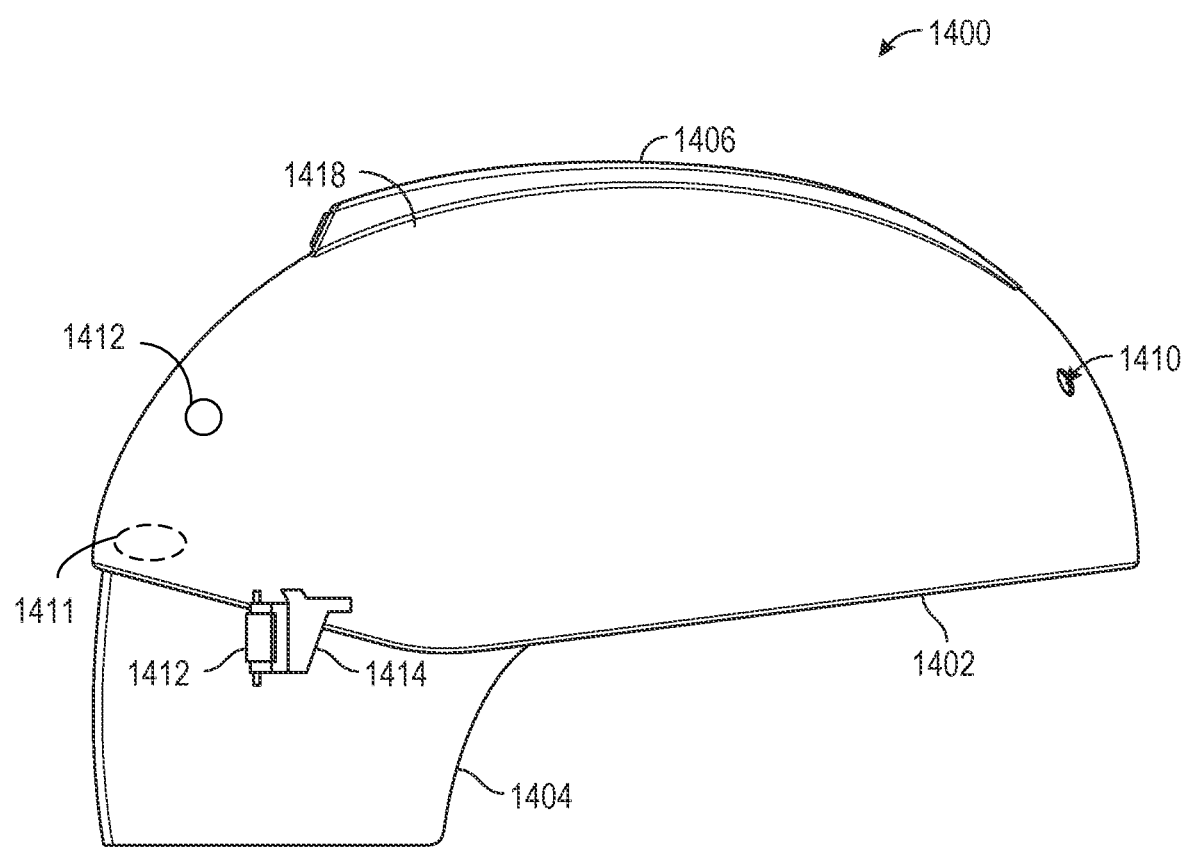
FIG. 15 is a diagram illustrating a side view of a head mounted device.

FIG. 14 is a diagram illustrating a front view of a head mounted device 1400. FIG. 15 is a block diagram illustrating a side view of a head mounted device 1400, according to some example embodiments. The HMD 1400 includes a helmet 1402 connected to a visor 1404. The helmet 1402 may include sensors (e.g., optical and audio sensors) 1408 and 1410 disposed in the front, back, and a top section 1406 of the helmet 1402. Display lenses 1412 are mounted on a lens frame 1414. The lens frame 1414 is connected to an underside of the helmet 1402. The display lenses 1412 include a partially transparent display. The helmet 1402 includes an eye gaze tracking sensor 1411 in a housing of the helmet 1402. The eye gaze tracking sensor 1411 tracks a position of the pupil of the eye of the wearer of the helmet 1402 to determine a direction at which the user is starting. The eye gaze tracking sensor 1411 also determines how long the user is staring at a particular point. The eye gaze tracking sensor 1411 also determines whether the user is blinking and how many times the user is blinking, time duration of each blink. Programmable operations of the HMD 1400 may be defined based on the staring duration, the number of eye blinks, a head movement, or a combination thereof. Data from the eye gaze tracking sensor 1411 may be combined with data from other sensors such Inertial Measurement Unit (IMU), gyroscope data, temperature data, and location data, to generate a range of conditions associated with the virtual content created at the helmet 1402. For example, the helmet 1402 may be used to record a video of a user of the helmet 1402 fixing a machine. When another helmet user senses that a similar machine, viewed by the other helmet, is broken, the virtual content (video clip) is displayed in that helmet. For example, the video clip is displayed when the helmet is in a position/orientation similar to the position/orientation when the helmet 1402 was used to record the video clip.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
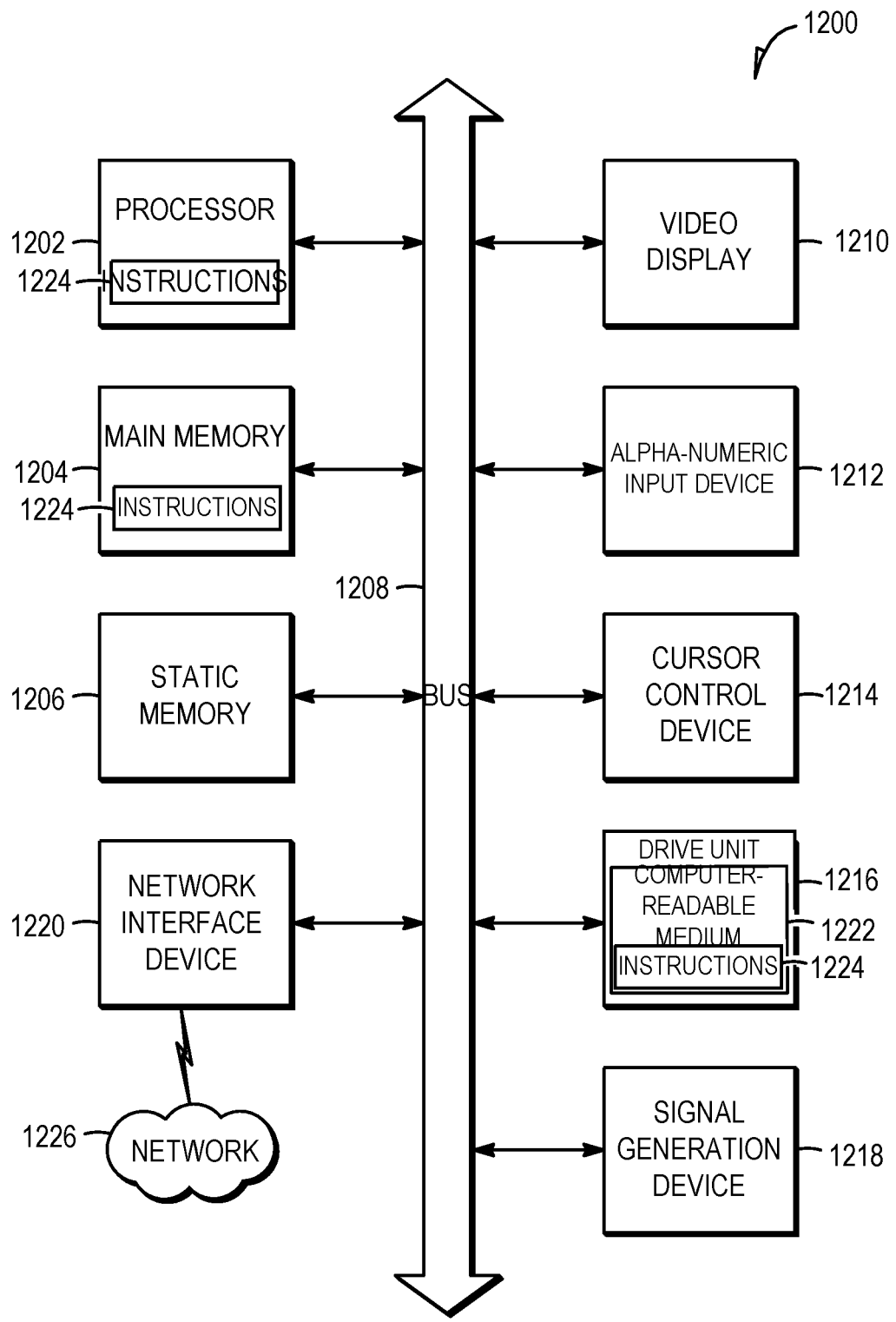
FIG. 12 is a block diagram illustrating components of a machine, according to some example embodiments, able to read instructions from a machine-readable medium and perform any one or more of the methodologies discussed herein.

FIG. 12 is a block diagram of a machine in the example form of a computer system 1200 within which instructions 1224 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., Wi-Fi and WiMAX networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 13:
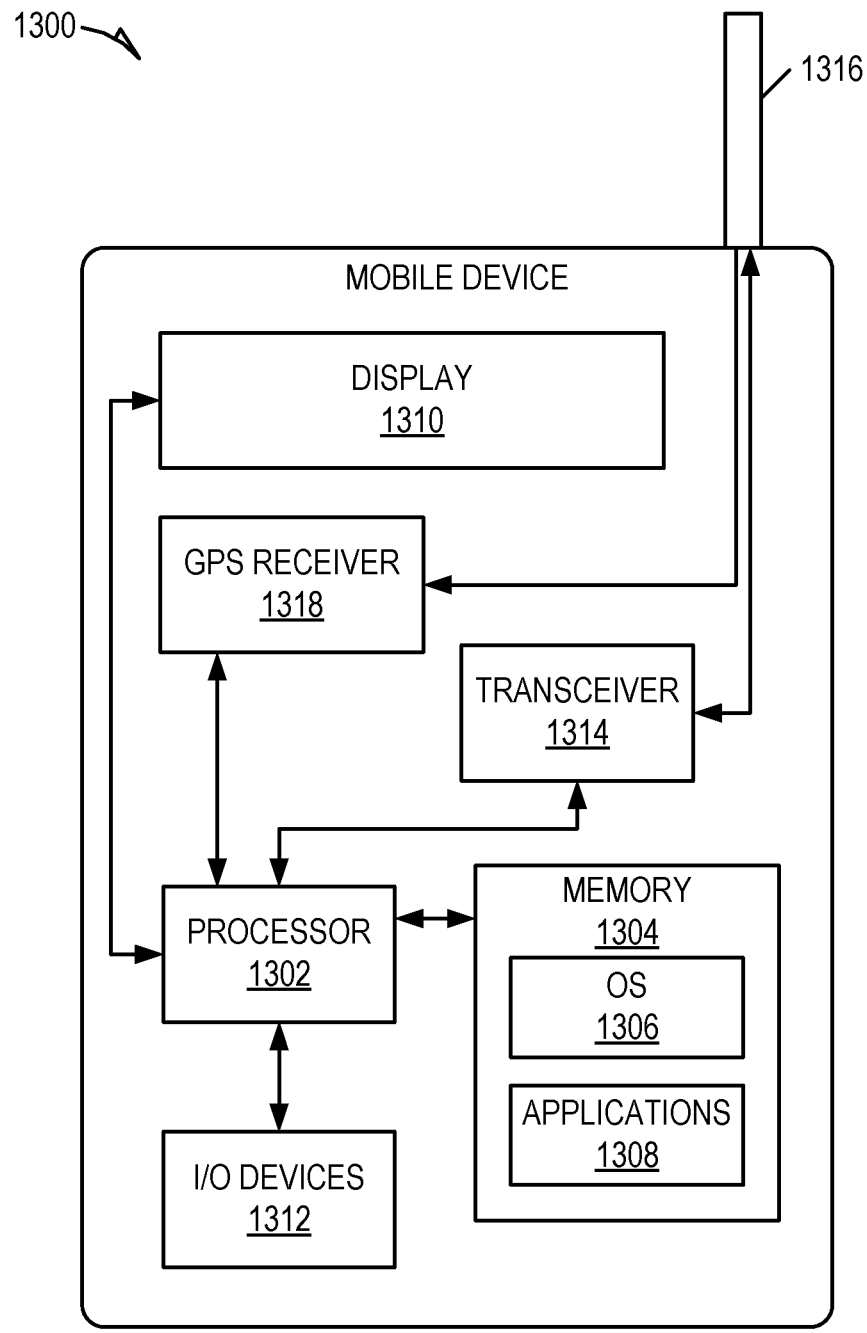
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308, such as a mobile location enabled application that may provide location based services to a user. The processor 1302 may be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A head mounted device comprising:
a display;
an optical sensor;
a processor; and
a non-transitory storage medium having instructions encoded thereon that, when executed by the processor, cause the head mounted device to:
capture, by the optical sensor, a video depicting a user performing a physical operation in relation to a physical object, the physical object associated with an object identifier;
determine metadata identifying positions of the head mounted device relative to the physical object during the capturing of the video;
identify feature points of the physical object in the video;
retrieve a virtual object based on the feature points of the physical object;
generate virtual content based on the video, the metadata, and the virtual object; and
send, to a server, the object identifier and the virtual content, causing the object identifier and the virtual content to be stored relationally in a data storage that stores a plurality of sets of virtual content associated with a plurality of physical objects and corresponding object identifiers.

2. The head mounted device of claim 1, wherein an operation on the physical object is recorded by the optical sensor in response to at least a verbal recording instruction from a user of the head mounted device to form the virtual content.

3. The head mounted device of claim 2, wherein the operation is recorded as at least multimedia content, and wherein the optical sensor comprise at least a camera and a microphone.

4. The head mounted device of claim 1, wherein the head mounted device is further caused to tag the physical object in the video with the metadata.

5. The head mounted device of claim 4, wherein the virtual content and the metadata are stored on a server such that the metadata remains associated with the virtual content upon retrieval.

6. The head mounted device of claim 1, wherein the head mounted device is further caused to:
detect the object identifier associated with the physical object;
send the detected object identifier to the server, causing the server to retrieve the virtual content associated with the physical object; and
receive the virtual content associated with the physical object.

7. The head mounted device of claim 6, wherein the user has an option to at least modify, supplement or delete the virtual content.

8. The head mounted device of claim 1, wherein the metadata or the object identifier is associated with a visual identifier, the optical sensor captures an image of the visual identifier, and the processor determines the metadata or visual identifier based on the image of the visual identifier.

9. The head mounted device of claim 8, wherein the visual identifier comprise at least an error code, a serial number, feature points, or a quick response (QR) code on the physical object.

10. The head mounted device of claim 8, wherein the metadata further comprise at least an orientation of the head mounted device relative to a physical object, an operational status of the physical object, or a temperature range related to the physical object.

11. A method, comprising:
capturing, by an optical sensor of a head mounted device, a video depicting a user performing a physical operation in relation to a physical object, the physical object associated with an object identifier;
determining metadata identifying positions of the head mounted device relative to the physical object during the capturing of the video;
identifying feature points of the physical object in the video;
retrieving a virtual object based on the feature points of the physical object;
generating virtual content based on the video, the metadata, and the virtual object; and
sending, to a server, the object identifier and the virtual content, causing the object identifier and the virtual content to be stored relationally in a data storage that stores a plurality of sets of virtual content associated with a plurality of physical objects and corresponding object identifiers.

12. The method of claim 11, further comprising:
recording, by the head mounted device, an operation on the physical object by the optical sensor in response to at least a verbal recording instruction from a user of the head mounted device to form the virtual content.

13. The method of claim 12, further comprising:
recording, by the head mounted device, the operation as at least multimedia content, wherein the optical sensor comprise at least a camera and a microphone.

14. The method of claim 11, further comprising:
tagging, by the head mounted device, the physical object in the video with the metadata.

15. The method of claim 14, further comprising:
storing, by the head mounted device, the virtual content, and the metadata on the server such that the metadata remains associated with the virtual content upon retrieval by a virtual content access module.

16. The method of claim 14, wherein the metadata comprises at least predefined conditions or visual identifiers.

17. The method of claim 11, wherein further comprising:
detecting the object identifier associated with the physical object;
sending the detected object identifier to the server, causing the server to retrieve the virtual content associated with the physical object; and
receiving the virtual content associated with the physical object.

18. The method of claim 17, wherein the user has an option to at least modify, supplement or delete the virtual content.

19. A non-transitory machine-readable medium, comprising executable instructions that, when executed by a processor of a head mounted device, cause the head mounted device to:
capture, by an optical sensor of the head mounted device, a video depicting a user performing a physical operation in relation to a physical object, the physical object associated with an object identifier;
determine metadata identifying positions of the head mounted device relative to the physical object during the capturing of the video;
identify feature points of the physical object in the video;
retrieve a virtual object based on the feature points of the physical object;
generate virtual content based on the video, the metadata, and the virtual object; and
send, to a server, the object identifier and the virtual content, causing the object identifier and the virtual content to be stored relationally in a data storage that stores a plurality of sets of virtual content associated with a plurality of physical objects and corresponding object identifiers.

20. The non-transitory machine-readable medium of claim 19, comprising additional executable instructions, that, when executed by the processor, cause the processor to:
detect the object identifier associated with the physical object; and
send the detected object identifier to the server, causing the server to retrieve the virtual content associated with the physical object; and
receive the virtual content associated with the physical object.

* * * * *